US011902950B2

(12) United States Patent
Xue et al.

(10) Patent No.: US 11,902,950 B2
(45) Date of Patent: Feb. 13, 2024

(54) CHANNEL OCCUPANCY TIME (COT) AWARE AUTONOMOUS SENSING FOR SIDELINK

(71) Applicant: QUALCOMM Incorporated, San Diego, CA (US)

(72) Inventors: Yisheng Xue, San Diego, CA (US); Jing Sun, San Diego, CA (US); Chih-Hao Liu, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 102 days.

(21) Appl. No.: 17/248,882

(22) Filed: Feb. 11, 2021

(65) Prior Publication Data

US 2022/0256539 A1     Aug. 11, 2022

(51) Int. Cl.
*H04W 72/0453*  (2023.01)
*H04W 72/02*    (2009.01)
*H04W 92/18*    (2009.01)

(52) U.S. Cl.
CPC ....... *H04W 72/0453* (2013.01); *H04W 72/02* (2013.01); *H04W 92/18* (2013.01)

(58) Field of Classification Search
CPC .. H04W 72/0453; H04W 72/02; H04W 92/18
See application file for complete search history.

(56) References Cited

U.S. PATENT DOCUMENTS

| | | | | |
|---|---|---|---|---|
| 2020/0178217 A1* | 6/2020 | Huang | | H04W 76/27 |
| 2020/0220694 A1* | 7/2020 | Khoryaev | | H04W 28/04 |
| 2021/0007096 A1* | 1/2021 | Huang | | H04W 72/02 |
| 2021/0051654 A1* | 2/2021 | Wang | | H04W 72/12 |
| 2021/0076236 A1* | 3/2021 | Kimura | | H04W 24/08 |
| 2021/0144750 A1* | 5/2021 | Cao | | H04W 72/0446 |
| 2021/0212106 A1* | 7/2021 | Farag | | H04W 74/002 |
| 2021/0314779 A1* | 10/2021 | Jiang | | H04L 5/0053 |
| 2021/0314916 A1* | 10/2021 | Fouad | | H04W 72/082 |
| 2021/0321396 A1* | 10/2021 | Li | | H04L 1/1896 |
| 2021/0329633 A1* | 10/2021 | Xing | | H04W 72/0446 |
| 2021/0345156 A1* | 11/2021 | Baek | | H04W 4/40 |
| 2021/0377939 A1* | 12/2021 | Chae | | H04W 28/26 |
| 2021/0385808 A1* | 12/2021 | Kwak | | H04L 1/1893 |
| 2022/0061055 A1* | 2/2022 | Freda | | H04W 72/1263 |
| 2022/0078761 A1* | 3/2022 | Kim | | H04L 5/0037 |
| 2022/0132558 A1* | 4/2022 | Lee | | H04W 24/10 |
| 2022/0159624 A1* | 5/2022 | Ko | | H04W 72/02 |
| 2022/0167315 A1* | 5/2022 | Park | | H04W 72/0446 |
| 2022/0240260 A1* | 7/2022 | Zhou | | H04W 72/542 |
| 2023/0022691 A1* | 1/2023 | Ji | | H04W 72/02 |
| 2023/0033409 A1* | 2/2023 | Lee | | H04W 4/40 |
| 2023/0171792 A1* | 6/2023 | Sun | | H04W 72/25 370/329 |

* cited by examiner

*Primary Examiner* — Yu-Wen Chang

(74) *Attorney, Agent, or Firm* — QUALCOMM Incorporated

(57) ABSTRACT

Wireless communications systems and methods related to COT aware autonomous sidelink sensing are provided. A first user equipment (UE) selects at least a first resource from available resources in a sidelink resource pool within a shared radio frequency band. The selecting the first resource may be based on a channel-access gap preceding each resource of the available resources. The first UE further transmits, to a second UE using the selected first resource, one or more data blocks for a sidelink transmission.

30 Claims, 13 Drawing Sheets

CHANNEL OCCUPANCY TIME (COT) AWARE AUTONOMOUS SENSING FOR SIDELINK

TECHNICAL FIELD

This application relates to wireless communication systems, and more particularly to channel occupancy time (COT) aware autonomous sensing for sidelink over a shared radio frequency band.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as 5$^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In a wireless communication network, a BS may communicate with a UE in an uplink direction and a downlink direction. Sidelink was introduced in LTE to allow a UE to send data to another UE without tunneling through the BS and/or an associated core network. The LTE sidelink technology had been extended to provision for device-to-device (D2D) communications, vehicle-to-everything (V2X) communications, and/or cellular vehicle-to-everything (C-V2X) communications. Similarly, NR may be extended to support sidelink communications, D2D communications, V2X communications, and/or C-V2X over licensed bands and/or unlicensed bands.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication performed by a first user equipment (UE), the method includes selecting at least a first resource from available resources in a sidelink resource pool within a shared radio frequency band. The selecting the first resource may be based on a channel-access gap preceding each resource of the available resources. The method may further include transmitting, to a second UE using the selected first resource, one or more data blocks for a sidelink transmission.

In an additional aspect of the disclosure, a first user equipment (UE) includes a processor configured to select at least a first resource from available resources in a sidelink resource pool within a shared radio frequency band based on a channel-access gap preceding each resource of the available resources. The first UE may further include a transceiver coupled to the processor. The transceiver may be configured to transmit, to a second UE using the selected first resource, one or more data blocks for a sidelink transmission.

In an additional aspect of the disclosure, a non-transitory computer-readable medium includes program code recorded thereon, and the program code includes code for causing a first user equipment (UE) to select at least a first resource from available resources in a sidelink resource pool within a shared radio frequency band based on a channel-access gap preceding each resource of the available resources. The program code may further include code for causing the first UE to transmit, to a second UE using the selected first resource, one or more data blocks for a sidelink transmission.

In an additional aspect of the disclosure, a first user equipment (UE), includes means for selecting at least a first resource from available resources in a sidelink resource pool within a shared radio frequency band based on a channel-access gap preceding each resource of the available resources. The first UE may further include means for transmitting, to a second UE using the selected first resource, one or more data blocks for a sidelink transmission.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
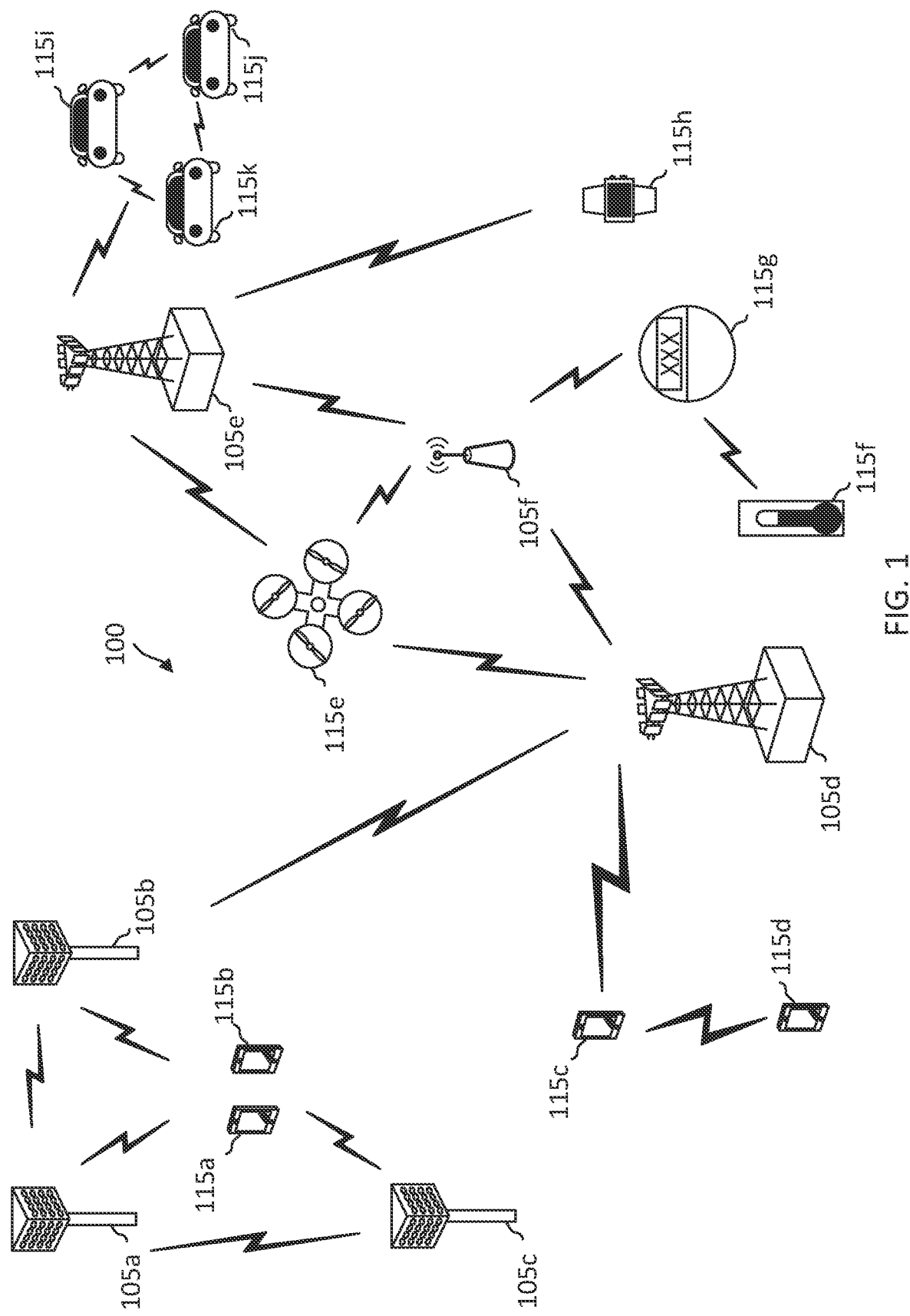
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Sidelink communications refers to the communications among user equipment devices (UEs) without tunneling through a base station (BS) and/or a core network. Sidelink communication can be communicated over a physical sidelink control channel (PSCCH) and a physical sidelink shared channel (PSSCH). The PSCCH and PSSCH are analogous to a physical downlink control channel (PDCCH) and a physical downlink shared channel (PDSCH) in downlink (DL) communication between a BS and a UE. For instance, the PSCCH may carry sidelink control information (SCI) and the PSSCH may carry sidelink data (e.g., user data). Each PSCCH is associated with a corresponding PSSCH, where SCI in a PSCCH may carry reservation and/or scheduling information for sidelink data transmission in the associated PSSCH. Use cases for sidelink communication may include V2X, enhanced mobile broadband (eMBB), industrial IoT (IIoT), and/or NR-lite.

As used herein, the term "sidelink UE" can refer to a user equipment device performing a device-to-device communication or other types of communications with another user equipment device independent of any tunneling through the BS (e.g., gNB) and/or an associated core network. As used herein, the term "sidelink transmitting UE" can refer to a user equipment device performing a sidelink transmission operation. As used herein, the term "sidelink receiving UE" can refer to a user equipment device performing a sidelink reception operation. A sidelink UE may operate as a transmitting sidelink UE at one time and as a receiving sidelink UE at another time.

NR supports two modes of radio resource allocations (RRA), a mode-1 RRA and a mode-2 RRA, for sidelink over a licensed spectrum. The mode-1 RRA supports network controlled RRA that can be used for in-coverage sidelink communication. For instance, a serving BS may determine a radio resource on behalf of a sidelink UE and transmit an indication of the radio resource to the sidelink UE. The mode-2 RRA supports autonomous RRA that can be used for out-of-coverage sidelink UEs or partial-coverage sidelink UEs. For instance, an out-of-coverage sidelink UE or a partial-coverage UE may be preconfigured with a sidelink resource pool and may select a radio resource from the preconfigured sidelink resource pool for sidelink communication.

For mode-2 RRA, a sidelink UE may perform sensing in a sidelink resource pool. The sensing may include decoding SCI and/or measuring signal energy in the channel. For SCI decoding, the UE may blindly decode SCI from a PSCCH of each resource. If the decoding is successful, the UE may record the decoded SCI. For signal measurements, the UE may receive a signal from each resource and compute a reference signal received power (RSRP) and/or receive signal strength indicator (RSSI) for each resource. The UE may also record the signal measurements. The UE may generate a packet (e.g., a medium access control (MAC), packet data unit (PDU)) for transmission. Upon generating the packet, the UE may trigger a resource selection. The UE may define a sensing window and a resource selection window in the resource pool with respect to a time when the resource selection is triggered. The sensing window may be located prior to the trigger, and the resource selection window may be located after the trigger. The UE may determine the sensing window and the resource selection window based on a set of parameters, which may be preconfigured and/or predetermined). The UE may identify candidate resources within the resource selection window based on past sensing results (e.g., decoded SCI and/or signal measurements) obtained in the sensing window. In other words, the UE may predict resource usages in the resource selection window based on the past sensing results. The UE may randomly select a resource from the identified candidate resources. The UE may transmit a sidelink transmission (e.g., including SCI in a PSCCH and the packet in a PSSCH) using the selected resource. In some instances, the UE may select multiple resources from the candidate resources, for example, a first resource for an initial transmission of the packet and a second resource for a retransmission of the packet when hybrid automatic repeat request (HARQ) is used for the packet transmission.

The deployment of NR over an unlicensed spectrum is referred to as NR-unlicensed (NR-U). Some studies have been conducted for NR-U deployment over 5 gigahertz (GHz) unlicensed bands. Channel access in an unlicensed band may be regulated by regulations. For instance, listen-before-talk (LBT) is a channel access scheme that may be used in the unlicensed spectrum. In particular, to avoid collisions, a wireless communication device (e.g., a BS and/or a UE) may employ an LBT procedure to monitor for transmission opportunities (TXOPs) in the shared channel. When the LBT results in an LBT pass (the wireless communication device wins contention for the wireless medium), the wireless communication device may access the shared medium to transmit and/or receive data. For example, a transmitting node (e.g., a BS or a UE) may perform an LBT prior to transmitting in the channel. When the LBT passes, the transmitting node may proceed with the transmission. When the LBT fails, the transmitting node may refrain from transmitting in the channel. In an example, the LBT may be based on energy detection. For example, the LBT results in a pass when signal energy measured from the channel is below a threshold. Conversely, the LBT results in a failure when signal energy measured from the channel exceeds the threshold. In another example, the LBT may be based on signal detection. For example, the LBT results in a pass when a channel reservation signal (e.g., a predetermined preamble signal) is not detected in the channel Conversely, the LBT results in a failure when a channel reservation signal is detected in the channel A TXOP may also be referred to as channel occupancy time (COT).

In the licensed spectrum, a last OFDM symbol in each slot may be reserved as a gap to facilitate transmit/receive switching in a next slot. In some aspects, deployment of NR over the unlicensed spectrum may involve utilizing a similar structure of a gap in the last OFDM symbol of each slot as a common silence interval for the LBTs described above used to contend for channel occupancy time (COT) in a shared channel. For instance, a transmitting node may perform an LBT within such a gap (e.g., the common silence interval) preceding a slot to gain access to a shared channel for transmission over the slot. In that regard, as described herein, a "channel-access gap" may refer to a portion of a slot, such as the last OFDM symbol of the slot, in a shared channel, which may be used to access the channel. The channel-access gap may also be referred to as a "between-slot medium," as the channel-access gap may be positioned between the end of a portion of a first slot designated for data communication (e.g., transmission and/or reception) and a start of a following, second slot.

The present application describes mechanisms for COT aware autonomous sidelink sensing over a shared radio frequency band (e.g., in a shared spectrum or an unlicensed spectrum). In particular, the present application relates to mechanisms for utilizing channel-access gaps in the shared spectrum and/or unlicensed spectrum to perform a sidelink transmission. For instance, a UE may utilize a channel-access gap to contend for a COT (e.g., by performing a LBT), to transmit a burst transmission over consecutive slots in the time domain, to perform COT-sharing with another UE, and/or the like. In some aspects, a UE may select a resource from available resources in a sidelink resource pool within the shared radio frequency band based on a channel-access gap preceding each resource of the available resources. More specifically, in some aspects, the UE may determine an availability of the channel-access gap preceding the available resources, and the UE may select the resource based on this availability. In some aspects, for example, the UE may determine whether a channel-access gap preceding a resource is unavailable (e.g., reserved), available for a type 1 LBT (e.g., a category 4 (CAT4) LBT), or available for a type 2 LBT (e.g., a category 2 (CAT2) LBT), as described in greater detail below. The UE may further transmit, to a second UE using the second resource, one or more data blocks for a sidelink transmission.

As described above, in some aspects, the UE may determine whether the channel-access gap is available for a first channel access type (e.g., a type 1 LBT) or a second channel access type (e.g., a type 2 LBT) to determine the availability of the channel-access gap. A type 1 LBT may be similar to a category 4 (CAT4) LBT including a countdown (a random backoff procedure). A type 2 LBT may be similar to a category 2 (CAT2) LBT with no countdown. In some aspects, a channel-access gap available via a type 2 LBT (e.g., the second channel access type) may be a channel-access gap that is partially utilized and/or reserved by another UE. For instance, a first UE may contend for a channel occupancy time (COT) in a channel Upon winning the contention, the first UE can transmit in the channel during the COT and may also share the COT with other UEs by transmitting a COT sharing indicator. The UE may further perform post extension to transmit over at least a portion of the channel-access gap, reducing an idle interval on the channel. For instance, the UE may perform a burst transmission of two or more data blocks (e.g., transport blocks (TBs)) over a first resource, the portion of the channel-access gap following the first resource, and a second resource in a slot consecutive to the first resource (e.g., following the channel-access gap). The remaining portion of the channel-access gap may be available to a second UE to perform the type 2 LBT. The second UE may thus share the first UE's COT via a type 2 LBT in the channel-access gap. Moreover, in some aspects, the burst transmission may be scheduled and/or performed over resources in different subchannels. Scheduling a burst transmission over different subchannels may increase the likelihood that sufficient resources are available for the transmission, improving channel-access efficiency and/or efficacy.

In some aspects, a physical layer (PHY layer) of the UE may, based on sensing, identify the availability of channel-access gaps preceding the available resources. The PHY layer may identify a channel-access gap as being unreserved, partially reserved, or fully reserved based on the SCI decoding (e.g., SCI decoding of a reservation for a channel-access gap), signal measurements, and/or priority information. In some aspects, the PHY layer may determine whether the channel-access gap is available for the first channel access type, such as a type 1 LBT, or the second channel access type, such as a type 2 LBT, to determine the availability of the channel-access gap. Further, in some aspects, the PHY layer may transmit an indication of the availability of the channel-access gap to a media access control layer (MAC layer) of the UE. The indication of the availability of the channel-access gap may include an indication associated with each resource of the available resources (e.g., the channel-access availability is indicated on a per-resource basis) and/or an indication associated with each slot preceding a resource of the available resources (e.g., the channel-access availability is indicated on a per-slot basis). Further, in some aspects, the MAC layer may transmit a sensing request including a request for the indication of the availability of the channel-access gap to the PHY layer, and the PHY layer may determine the availability of the channel-access gap based on the sensing request.

In some aspects, the UE may identify one or more leading resources for one or more subsets (e.g., groups) of two or more resources in the available resources, where each of the one or more subsets is in consecutive slots. That is, for example, the UE may identify groups of two or more consecutive resources in the time domain and may identify the initial (e.g., leading) resource of these groups. In some cases, the UE may use a group of consecutive resources in the time domain to perform a burst transmission of two or more data blocks. While the resources in the subsets may be positioned in consecutive slots, in some aspects, a subset may include resources in different subchannels in the frequency domain. Further, the UE may select a first leading resource of the one or more leading resources as the selected first resource. At least a first subset of the one or more subsets may include the first leading resource.

In some aspects, the UE may select the first leading resource based on a priority of the first leading resource among the one or more leading resources. For instance, leading resources that lead greater numbers of subsets (e.g., groups) of consecutive resources may have a higher priority than leading resources that lead fewer numbers of subsets. Accordingly, the UE may select the first leading resource based on the first leading resource having a higher priority than the other leading resources. In some aspects, the UE may select the first leading resource randomly from among leading resources having equal priority. In some aspects, the UE may select the first leading resource based on a quantity of the subsets led by the leading resource. In that regard, the first leading resource may be associated with multiple subsets, where at least some of the resources of these subsets are located in different subchannels in the frequency domain. Further, in some aspects, the UE may determine the quantity of resources included in the first subset led by the first leading resource and may select the first resource based on this quantity of resources. In particular, the UE may receive candidate resources at the MAC layer and may filter the candidate resources based on a size L for a burst transmission, where L may represent a number of TBs in the burst transmission. The UE may then select the first resource from among the subsets of L resources in consecutive slots (e.g., based on the first subset including L resources). Additionally or alternatively, the subsets of resources may be identified at the PHY layer of the UE based on the quantity of resources included in the subsets (e.g., based on the size L). The PHY layer may then filter the candidate resources reported as available resources to the MAC layer based on the identified subsets.

Further, in some aspects, the UE may select a second resource from the available resources, may determine that the second resource is unavailable based on a reevaluation of the availability of the second resource, and based on determining the second resource is unavailable, the UE may select the first resource. For instance, in the case that the second resource is a leading resource, the UE may identify the first resource as a leading resource and select the first resource. In some aspects, in the case that the second resource is a non-leading resource, the UE may select the first resource in response to determining the second resource is unavailable based on the priority of the one or more data blocks and/or the number of non-leading resources identified as unavailable in a last-minute re-evaluation.

In some aspects, the UE may select the first resource based on a burst transmission configuration. For instance, the burst transmission configuration may include an indication to select the first resource, where the selection is based on the channel-access gap, based on at least one of a quantity of data blocks queued for transmission at the UE, priorities associated with the data blocks, a packet delay budget associated with the data blocks, a network configuration, or a channel busy ratio (CBR).

In some aspects, the UE may transmit two or more data blocks for the sidelink transmission using the selected first resource and a first-channel access gap following the first resource. For example, as described above, the UE may use post extension to use at least a portion of the first channel-access gap.

In some aspects, the MAC layer may transmit a resource reevaluation request to the PHY layer for a last-minute re-evaluation of a resource. The MAC layer may further receive an indication of the availability of the first resource and a second resource included in a first subset with the first resource (e.g., lead by the first resource) based on the resource revaluation request. Further, in some aspects, the UE may determine the second resource (e.g., a non-leading resource) is unavailable based on indication of the availability (e.g., an updated resource report). Based on determining the second resource is unavailable, the UE may select a third resource from among the available resources to replace the second resource. The UE may then transmit the one or more data blocks using the first resource and the third resource (e.g., the replacement resource). In some aspects, based on determining the second resource is unavailable, the UE may transmit a partial burst transmission. To that end, the UE may refrain from transmitting a portion of the burst transmission, for example, by excluding a data block or TB from the burst transmission.

Aspects of the present disclosure can provide several benefits. For example, as described above, a UE may occupy a portion of a channel-access gap. In some aspects, occupying this portion may maintain an idle interval on the channel below a threshold (e.g., 25 μs) at which the UE is required to release (e.g., terminate) a COT. Accordingly, a UE may transmit multiple data blocks (e.g., TBs) over consecutive slots in the time domain. In particular, the multiple data blocks may be transmitted after a single type 1 LBT passes. Further, a UE may flexibly facilitate COT sharing. For example, by not releasing the COT during the channel-access gap, the UE may extend the time available for another UE to complete a COT-sharing processing delay and successfully share the COT. Moreover, by utilizing channel-access gaps according to the mechanisms described herein, the volume and/or efficiency of data communications on a shared channel may be improved.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for DL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) and may broadcast the RMSI and/or the OSI over a physical downlink shared channel (PDSCH). The MIB may be transmitted over a physical broadcast channel (PBCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network operating over an unlicensed frequency band. In such an aspect, the BSs 105 and the UEs 115 may be operated by multiple network operating entities. To avoid collisions, the BSs 105 and the UEs 115 may employ an LBT procedure to monitor for transmission opportunities (TXOPs) in the shared channel A wireless communication device may perform an LBT in the shared channel. LBT is a channel access scheme that may be used in the unlicensed spectrum. When the LBT results in an LBT pass (the wireless communication device wins contention for the wireless medium), the wireless communication device may access the shared medium to transmit and/or receive data. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel. In an example, the LBT may be based on energy detection. For example, the LBT results in a pass when signal energy measured from the channel is below a threshold. Conversely, the LBT results in a failure when signal energy measured from the channel exceeds the threshold. In another example, the LBT may be based on signal detection. For example, the LBT results in a pass when a channel reservation signal (e.g., a predetermined preamble signal) is not detected in the channel Conversely, the LBT results in a failure when a channel reservation signal is detected in the channel A TXOP may also be referred to as channel occupancy time (COT).

Additionally, an LBT may be in a variety of modes. An LBT mode may be, for example, a category 4 (CAT4) LBT or a category 2 (CAT2) LBT. A CAT2 LBT refers to an LBT without a random backoff period. A CAT4 LBT refers to an LBT with a random backoff and a variable contention window (CW). A serving BS 105 may perform a CAT4 LBT to acquire a COT for communication with a UE. Additionally, the BS 105 may transmit a COT indication, for example, at the beginning of the COT, to indicate a duration of the COT and/or one or more subbands where the COT. The serving BS 105 may share the COT with a UE 115. To share the BS 105's COT, the UE may perform a CAT2 LBT within the BS 105's COT. Upon passing the CAT2 LBT, the UE may transmit a UL transmission within the BS 105's COT. A UE 115 may also acquire a COT outside of a COT of the serving BS 105 for UL transmission by performing a CAT4 LBT. In some instances, the UE 115 may also share the UE 115's COT with the BS 105. In some instances, the CAT4 LBT mode may be referred to as a type 1 LBT, and the CAT2 LBT mode may be referred to as a type 2 LBT.

Figure 2:
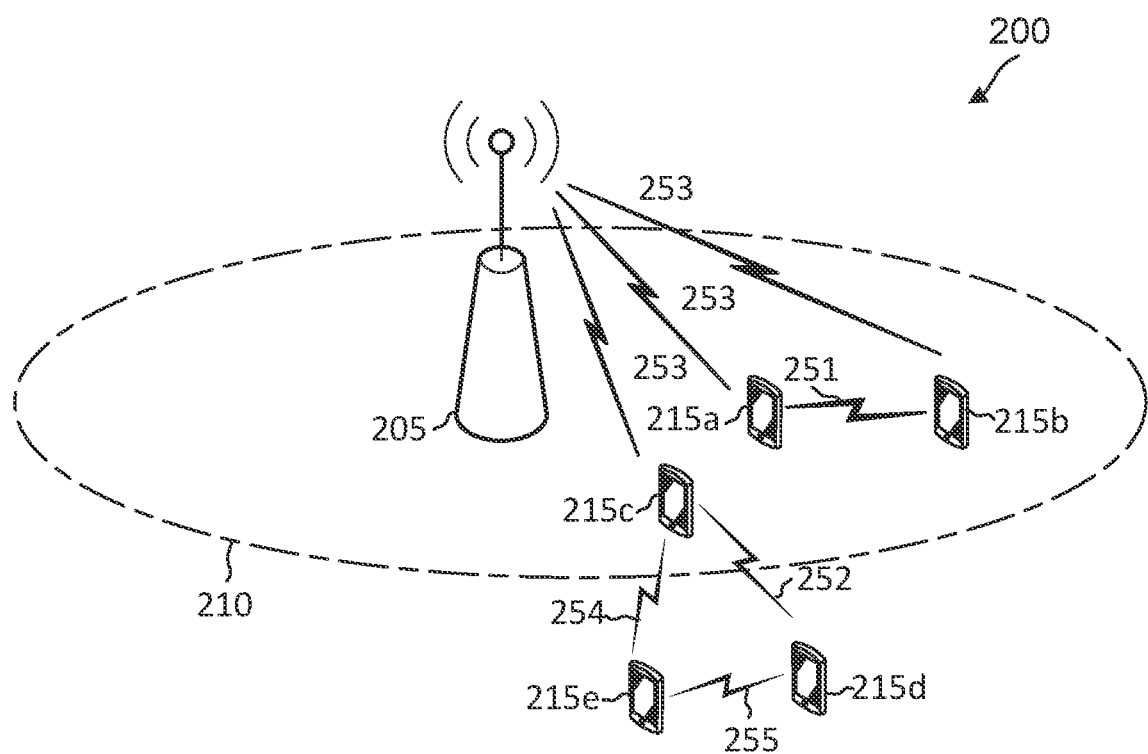
FIG. 2 illustrates a wireless communication network that provisions for sidelink communications according to some aspects of the present disclosure.

In some aspects, the network 100 may provision for sidelink communications to allow a UE 115 to communicate with another UE 115 without tunneling through a BS 105 and/or the core network as shown FIG. 2. As discussed above, sidelink communication can be communicated over a PSCCH and a PSSCH. For instance, the PSCCH may carry SCI and the PSSCH may carry SCI and/or sidelink data (e.g., user data). Each PSCCH is associated with a corresponding PSSCH, where SCI in a PSCCH may carry reservation and/or scheduling information for sidelink data transmission in the associated PSSCH. SCI may also carry information to reserve future resources (e.g., up to about two future PSSCH for retransmissions with HARQ). In some examples, a transmitting sidelink UE 115 may indicate SCI in two stages. In a first-stage SCI, the UE 115 may transmit SCI in PSCCH carrying information for resource allocation and decoding a second-stage SCI. The first-stage SCI may include at least one of a priority, PSSCH resource assignment, resource reservation period (if enabled), PSSCH DMRS pattern (if more than one pattern is configured), a second-stage SCI format (e.g., size of second-stage SCI), an amount of resources for the second-stage SCI, a number of PSSCH demodulation reference signal (DMRS) port(s), a modulation and coding scheme (MCS), etc. In a second-stage SCI, the UE 115 may transmit SCI in PSSCH carrying information for decoding the PSSCH. The second-stage SCI may include a -bit L1 destination identifier (ID), an 8-bit L1 source ID, a HARQ process ID, a new data indicator (NDI), a redundancy version (RV), etc. It should be understood that these are examples, and the first-stage SCI and/or the second-stage SCI may include or indicate additional or different information than those examples provided. Sidelink communication can also be communicated over a physical sidelink feedback control channel (PSFCH), which indicates an acknowledgement(ACK)-negative acknowledgement (NACK) for a previously transmitted PSSCH.

In some aspects, a pair of sidelink transmitting UE 115 and sidelink receiving UE 115 may communicate with each other using the autonomous mode-2 RRA discussed above. For instance, the sidelink transmitting UE 115 may continuously sense or monitor resources in a sidelink resource pool. The sensing or monitoring may include decoding SCI decoding and/or measuring signal energy in the channel. The sidelink transmitting UE 115 may record the SCI decoding results and the signal measurements. Upon receiving a data packet for transmission, the sidelink transmitting UE 115 may determine a resource selection window and identify candidate resources from the resource selection window based on sensing results (e.g., decoded SCI and signal measurements) obtained from a sensing window as will be discussed more fully below in FIGS. 3A-3B. The sidelink transmitting UE 115 may randomly select a resource from the candidate resources and transmit a sidelink transmission (e.g., including SCI over a PSCCH and/or data over a PSSCH) using the selected resource.

According to aspects of the present disclosure, the sidelink transmitting UE 115 may select a resource for the sidelink transmission based on a channel-access gap preceding each of the available resources (e.g., the candidate resources). For instance, the sensing and/or identification of candidate resources at the sidelink transmitting UE 115 may identify the availability of the channel-access gap, as will be described more fully.

FIG. 2 illustrates an example of a wireless communication network 200 that provisions for sidelink communications according to embodiments of the present disclosure. The network 200 may correspond to a portion of the network 100. FIG. 2 illustrates one BS 205 and five UEs 215 (shown as 215a, 215v, 215c, 215d, and 215e) for purposes of simplicity of discussion, though it will be recognized that embodiments of the present disclosure may scale to any suitable number of UEs 215 (e.g., the about 2, 3, 4, 5, 7 or more) and/or BSs 205 (e.g., the about 2, 3 or more). The BS 205 and the UEs 215 may be similar to the BSs 105 and the UEs 115, respectively. The BS 205 and the UEs 215 may share the same radio frequency band for communications. In some instances, the radio frequency band may be a licensed band. In some instances, the radio frequency band may be an unlicensed band (e.g., in a 5 GHz band). In some instances, the radio frequency band may be a frequency range 1 (FR1) band. In some instances, the radio frequency band may be a FR2 band. In general, the radio frequency band may be at any suitable frequency and may have any suitable bandwidth (e.g., about 5 MHz, about 10 MHz, about 20 MHz, about 80 MHz, about 100 MHz or more).

In the network 200, some of the UEs 215 may communicate with each other in peer-to-peer communications. For example, the UE 215a may communicate with the UE 215b over a sidelink 251, the UE 215c may communicate with the UE 215d over a sidelink 252 and/or with the UE 215e over a sidelink 254, and the UE 215d may communicate with the UE 215e over a sidelink 255. The sidelinks 251, 252, 254, and 255 are unicast bidirectional links. Some of the UEs 215 may also communicate with the BS 205 in a UL direction and/or a DL direction via communication links 253. For instance, the UE 215a, 215b, and 215c are within a coverage area 210 of the BS 205, and thus may be in communication with the BS 205. The UE 215d and UE 215e are outside the coverage area 210, and thus may not be in direct communication with the BS 205. In some instances, the UE 215c may operate as a relay for the UE 215d to reach the BS 205. In some aspects, some of the UEs 215 are associated with vehicles (e.g., similar to the UEs 115i-k) and the communications over the sidelinks 251 and/or 252 may be C-V2X communications. C-V2X communications may refer to communications between vehicles and any other wireless communication devices in a cellular network.

Figure 3A:
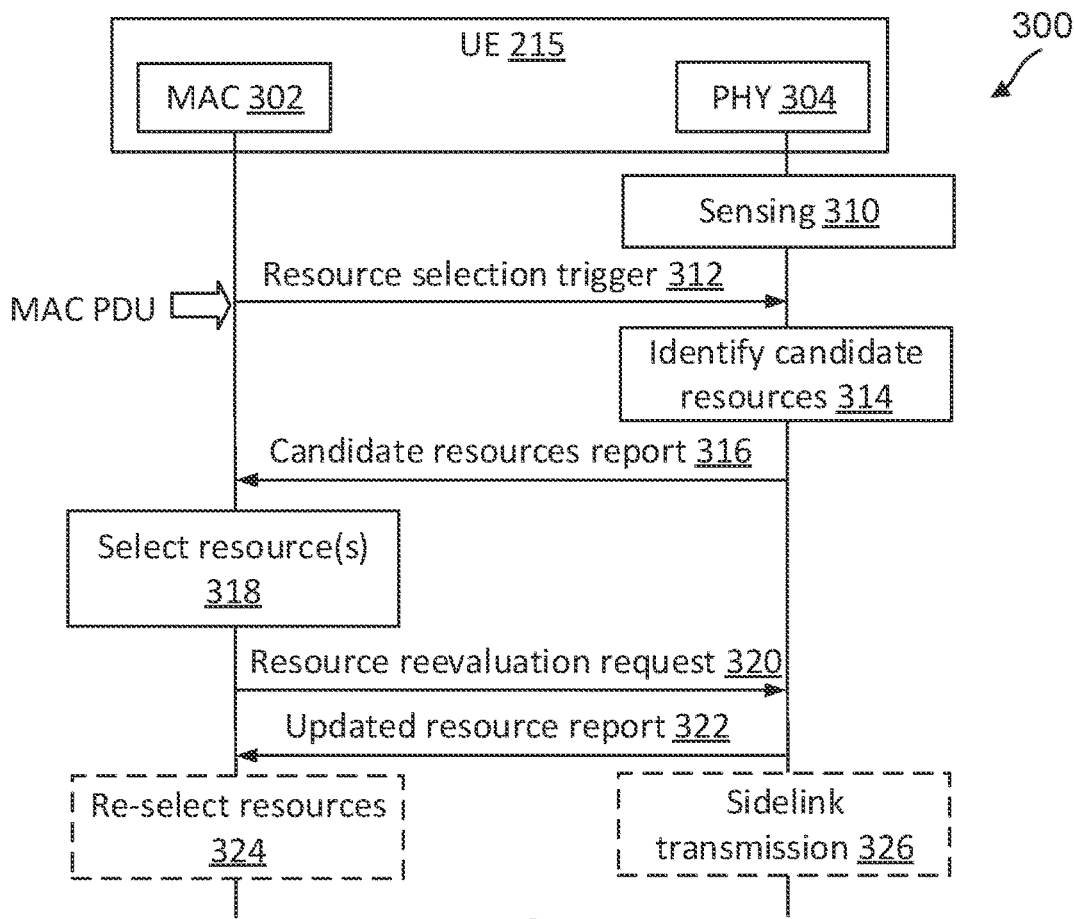
FIG. 3A is a sequence diagram illustrating an autonomous sidelink sensing method according to some aspects of the present disclosure.
Figure 3B:
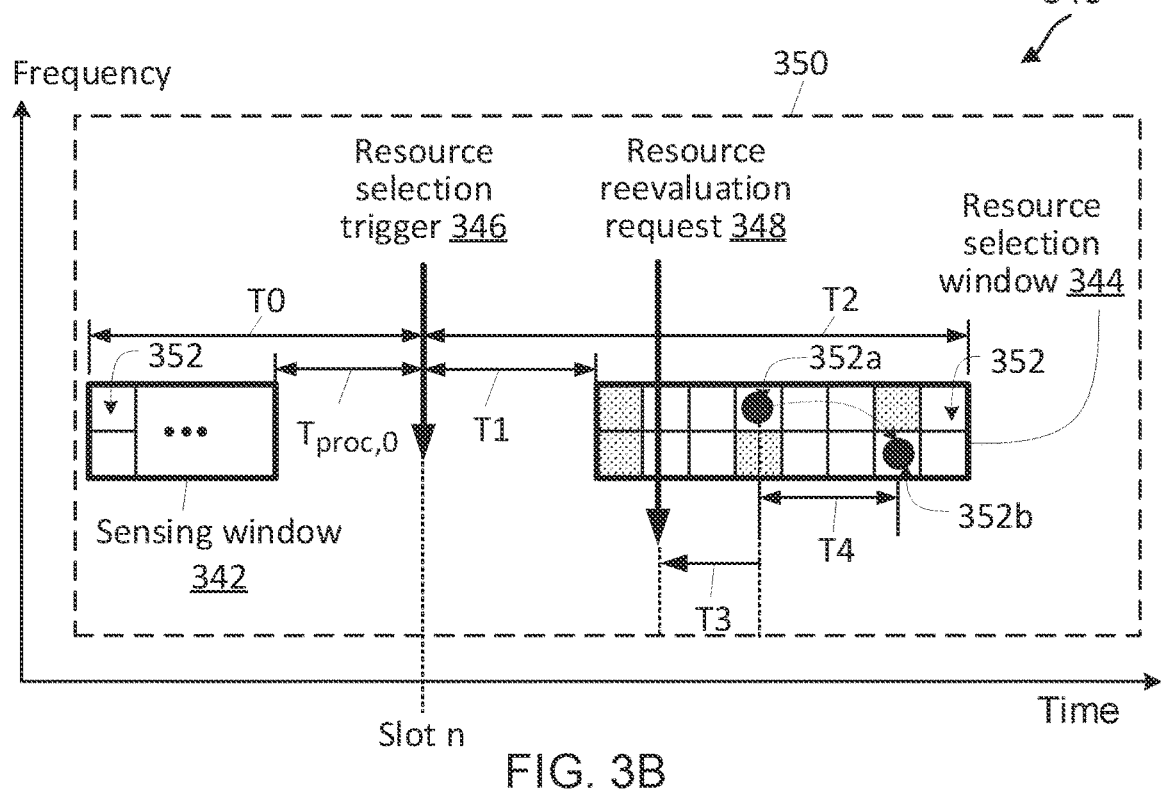
FIG. 3B illustrates an autonomous sidelink sensing scheme according to some aspects of the present disclosure.

FIGS. 3A and 3B are discussed in relation to each other to illustrate autonomous sidelink sensing using mode-2 RRA. FIG. 3A is a sequence diagram illustrating an autonomous sidelink sensing method 300 according to some aspects of the present disclosure. The method 300 may be implemented by a UE 215. As illustrated, the method 300 includes a number of enumerated actions, but embodiments of the method 300 may include additional actions before, after, and in between the enumerated actions. In some embodiments, one or more of the enumerated actions may be omitted or performed in a different order.

The autonomous sidelink sensing may be implemented between a MAC layer 302 and a PHY layer 304 at the UE 215. As shown, at action 310, the PHY layer 304 performs sensing in a sidelink resource pool (e.g., the sidelink resource pool 350 of FIG. 3B). A sidelink resource pool may refer to a set of time and frequency resources that may be used for sidelink operations. For instance, the PHY layer 304 may continuously sense or monitor resources (e.g., the resources 352 for FIG. 3B) in the sidelink resource pool. The sensing or monitoring may include decoding SCI and/or measuring signal energy in the channel. For SCI decoding, the PHY layer 304 may blindly decode SCI from a PSCCH of each resource. If the decoding is successful, the PHY layer 304 may record the decoded SCI. For signal measurements, the PHY layer 304 may receive a signal from each resource and compute a reference signal received power (RSRP) and/or receive signal strength indicator (RSSI) for each resource. The PHY layer 304 may also record the signal measurements.

At action 312, the MAC layer 302 sends a resource selection trigger (e.g., the resource selection trigger 346 of FIG. 3B) to the PHY layer 304, for example, based on a MAC PDU being generated and ready for transmission.

At action 314, in response to the resource selection trigger, the PHY layer 304 identifies candidate resources from the resource pool based on the sensing result. In this regard, the PHY layer 304 may determine a sensing window (e.g., the sensing window 342 of FIG. 3B) and a resource selection window (e.g., a resource selection window 344 of FIG. 3B) based on the resource selection trigger. The PHY layer 304 may identify candidate resources from the resource selection window based on past sensing results (e.g., decoded SCI and/or signal measurements) obtained in the sensing window. The resource selection trigger, the sensing window, and the resource selection window are shown in FIG. 3B.

FIG. 3B illustrates an autonomous sidelink sensing scheme 340 according to some aspects of the present disclosure. The scheme 340 may be employed by the UE 215 or any other UEs such as the UEs 115 and 215. In FIG. 3B, the x-axis represents time in some arbitrary units, and the y-axis represents frequency in some arbitrary units.

In the scheme 340, the UE 215 is preconfigured with a sidelink resource pool 350. The sidelink resource pool 350 may span a certain frequency bandwidth in a licensed band. The sidelink resource pool 350 may include a plurality of time-frequency resources 352. Each resource 352 may include a certain number of symbols (e.g., OFDM symbols) in time and a certain number of frequency subcarriers in frequency. In some aspects, the each resource 352 may be in units of RBs (e.g., including 12 consecutive subcarriers in frequency and a time duration of a slot or any suitable time duration). FIG. 3B illustrates the sidelink resource pool 350 over a certain time period. In general, a sidelink resource pool may include time-frequency resources over consecutive slots (e.g., a continuous time period) and/or slots that are spaced apart in time (e.g., non-consecutive time periods).

In the illustrated example of FIG. 3B, the MAC layer 302 may generate a MAC PDU at slot n and may generate a resource selection trigger 346 at slot n. Upon receiving the resource selection trigger 346, the PHY layer 304 may define a sensing window 342 and a resource selection window 344 with respect to the time of the resources selection trigger 346 based on a set of parameters including $T_{proc,0}$, $T_{proc,1}$, T0, T1, T2, and $T2_{min}$. For instance, the PHY layer 304 may determine a start of the sensing window 342 based on a T0 duration before the resource selection trigger 346 and may determine an end of the sensing window 342 based on a $T_{proc,0}$ duration before the resource selection trigger 346. As shown, the sensing window 342 starts at the start of the T0 duration and ends at the start of the $T_{proc,0}$ duration. The PHY layer 304 may determine a start of the resource selection window 344 based on a T1 duration after the resource selection trigger 346 and may determine an end of the resource selection window 344 based on a T2 duration after the resource selection trigger 346. The T1 duration may have an upper bound limited by the parameter $T_{proc,1}$ (e.g., $0 \leq T1 \leq T_{proc,1}$). The T2 duration can be determined to meet a certain packet delay budget (PDB) and may have a lower bound limited by $T2_{min}$ (e.g., $T2_{min} \leq T2 \leq PDB$). As shown, the resource selection window 344 starts at the end of the T1 duration and ends at the end of the T2 duration. In some aspects, the PHY layer 304 may be preconfigured with some of the parameters (e.g., $T_{proc,0}$, $T_{proc,1}$). In some aspects, the PHY layer 304 may receive some of the parameters (e.g., T1, T2, $T2_{min}$) from an upper layer (e.g., an RRC layer). Although FIG. 3B illustrates the resource selection window 344 including 16 resources, it should be understood that in other examples a resource selection window can include a less number of resources (e.g., about 4, 5, 6, 8, or 10) or a greater number of resources (e.g., 17, 18, 19, 20, 24, 32, or more).

The PHY layer 304 may identify candidate resources 352 within the resource selection window 344 by examining or analyzing sensing results obtained within the sensing window 342. In other words, the PHY layer 304 may utilize past sensing results to predict future usages of resources 352 in the resource selection window 344. The PHY layer 304 may use a combination of SCI decoding, signal measurements, and/or priority information to identify candidate resources. In some aspects, the PHY layer 304 may exclude resources 352 in the resource selection window 344 that are reserved (e.g., based on SCI decoding in the sensing window 342 and/or prediction). The PHY layer 304 may exclude resources 352 in the resource selection window 344 that are to be used for transmissions with a higher traffic priority than the UE 215 (e.g., based on SCI decoding in the sensing window 342 and/or prediction). The PHY layer 304 may exclude resources 352 in the resource selection window 344 based on resources 352 within the sensing window 342 that have signal measurements (e.g., RSRP and/or RSSI) higher than a certain signal threshold and a predicted resource usage pattern. The PHY layer 304 may perform the resource filtering or exclusion by SCI decoding, priority, and/or signal measurements in the resource selection window 344 in any suitable order. If the remaining candidate resources 352 in the resource selection window 344 is less than 20% of the total resources in the resource selection window 344, the PHY layer 304 may increase the signal threshold and repeat the resource filtering or exclusion until the candidate resources 352 in the resource selection window 344 is about 20% of the total resources 352 in the resource selection window 344. In FIG. 3B, the candidate resources (available resources) 352 in the resource selection window 344 are shown as empty-filled boxes. The unavailable resources 352 are shown as pattern-filled boxes.

Returning to FIG. 3A, at action 316, the PHY layer 304 sends a candidate resource report indicating the identified candidate resources 352 (e.g., the empty-filled boxes in the resource selection window 344 shown in FIG. 3B). The report may indicate the time and frequency location information for the candidate resources.

At action 318, upon receiving the candidate resource report, the MAC layer 302 selects one or more resources from the candidate resources. For instance, the MAC layer 302 may randomly select a first resource from the candidate resources for transmitting the MAC PDU. As an example, if report includes a list of N candidate resources, the MAC layer 302 may draw a random number (e.g., k) between 1 and N and select $k^{th}$ candidate resources. In some instances, the UE 215 may apply HARQ to the transmission of a transport block (TB) (carrying the MAC PDU) and may retransmit the same TB upon receiving a NACK or failing to receive an ACK for the transmission from a corresponding receiving UE. Thus, the MAC layer 302 may also randomly select a second resource from the candidate resources by drawing another random number between 1 and N, for example, for a potential retransmission of the MAC PDU. FIG. 3B illustrates an example of the resource selection.

Referring to FIG. 3B, the MAC layer 302 may randomly select a first resource 352a (shown by a black circle) from the candidate resources for an initial transmission and may randomly select a second resource 352b (shown by a black circle) from the candidate resources for a retransmission. In some instance, the MAC layer 302 may select the second resource 352b for the retransmission such that the first resource 352a and the second resource 352b are separated by a T4 duration. In some aspects, the T4 duration may be less than about 32 slots or any other suitable time duration. In some aspects, the T4 duration may have a predetermined or preconfigured lower bound and/or upper bound.

Referring to FIG. 3A, at action 320, the MAC layer 302 sends a resource reevaluation request (e.g., the resource reevaluation request 348 of FIG. 3B) to the PHY layer 304. The resource reevaluation request may request the PHY layer 304 to report updated available resources at this time instant to double check whether the previously selected resources (e.g., resources 352a and 352b of FIG. 3B) are still available. In some instances, the MAC layer 302 may send the resource reevaluation request slightly before (e.g., 1 symbol, 2 symbols, 3 symbols, 4 symbol, or a slot) the actual time where the MAC PDU is to be transmitted using the selected first resource (e.g., the resource 352a in FIG. 3B). As such, the resource reevaluation request can also be referred to as a "last-minute re-evaluation".

Referring to FIG. 3B, the MAC layer 302 sends a resource reevaluation request 348 at T3 duration before the actual transmission time for the selected first resource 352a. In some aspects, the T3 duration may have a predetermined or preconfigured lower bound and/or upper bound.

Referring to FIG. 3A, at action 322, in response to the resource reevaluation request, the PHY layer 304 sends an updated resource report to the MAC layer 302. The PHY layer 304 may identify resources in the resource selection window 344 that are still available at the time instant when the resource reevaluation request is received. The PHY layer 304 may use substantially similar mechanisms as discussed at action 314 to identify available resources (candidate resources) at that time instant. If the first resource (e.g., the resource 352a) previously selected by the MAC layer 302 is no longer available, the PHY layer 304 may indicate an indication in the report. For instance, the report may include a re-selection flag set to 1 for the first resource. Similarly, if the second resource (e.g., the resource 352b) previously selected by the MAC layer 302 is no longer available, the PHY layer 304 may indicate an indication in the report. For instance, the report may include a re-selection flag set to 1 for the second resource.

If the first resource is no longer available, the MAC layer 302 may re-select another resource from the candidate resources indicated in the updated candidate resource report at action 324 and may repeat the action 320 and 322 at a later time for another last-minute resource reevaluation for newly selected resource. Otherwise, the PHY layer 304 may transmit the MAC PDU to another sidelink UE (e.g., the UEs 115 and/or 215) using the selected first resource at action 326.

Similarly, if the second resource (to be used for the retransmission) is no longer available, the MAC layer 302 may re-select another resource from the candidate resources indicated in the updated candidate resource report at action 324. The MAC layer 302 may also request the PHY layer 304 for a last-minute resource reevaluation for the resource to be used for the retransmission.

Figure 4:
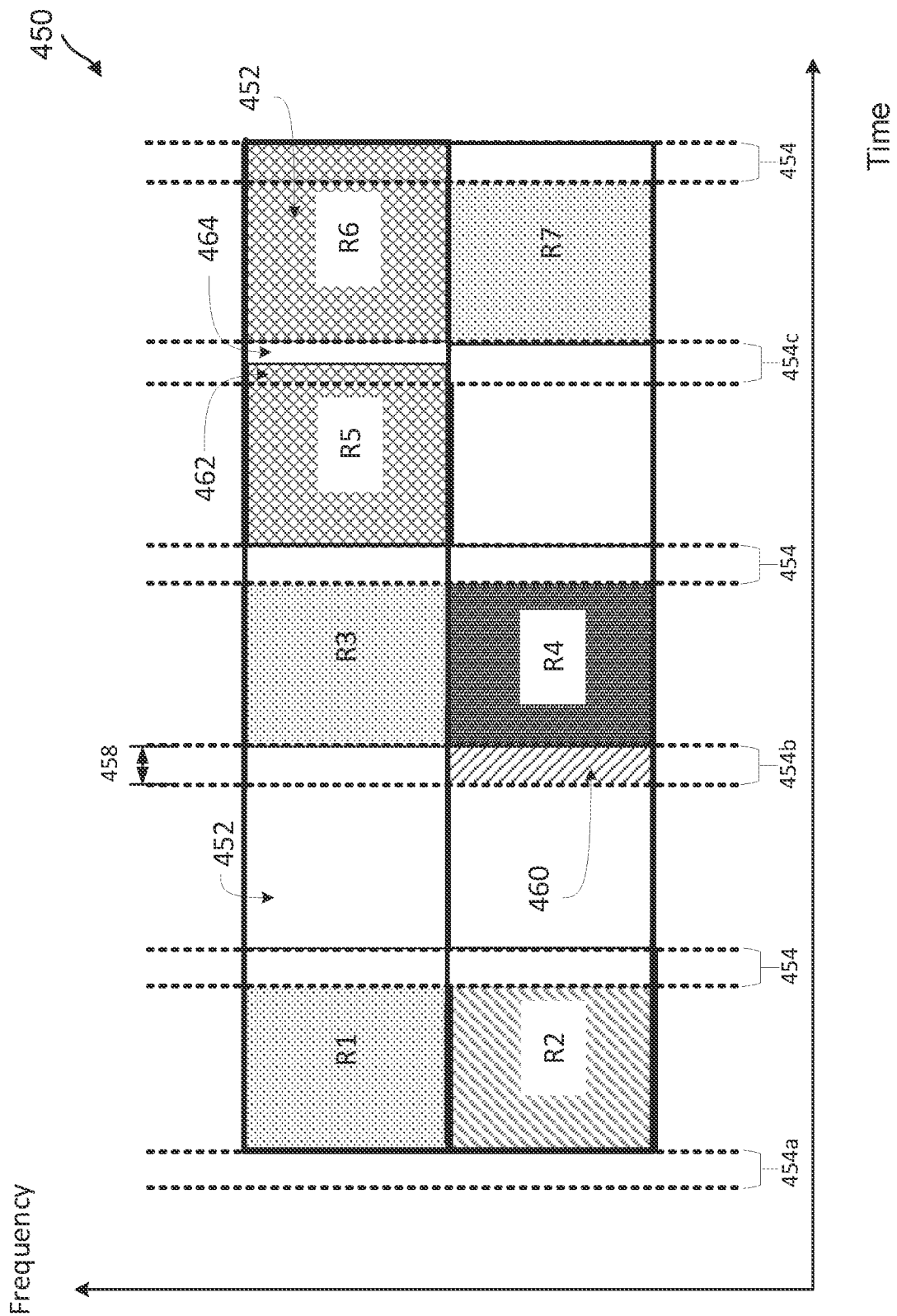
FIG. 4 illustrates a sidelink resource pool in a shared frequency band according to some aspects of the present disclosure.

FIG. 4 illustrates a sidelink resource pool 450 according to some aspects of the present disclosure. In FIG. 4, the x-axis represents time in some arbitrary units, and the y-axis represents frequency in some arbitrary units. As described above, a sidelink resource pool may refer to a set of time and frequency resources that may be used for sidelink operations. Further sidelink resource pool 450 may span a certain frequency bandwidth in an unlicensed band or shared frequency band.

The sidelink resource pool 450 may be similar to the sidelink resource pool 350. For instance, the sidelink resource pool 450 may include a plurality of time-frequency resources 452, which may be similar to the time-frequency resources 352 of FIG. 3B. Each resource 452 may include a certain number of symbols (e.g., OFDM symbols) in time and a certain number of frequency subcarriers in frequency. In some aspects, the resource 452 may be in units of RBs (e.g., including 12 consecutive subcarriers in frequency and a time duration of a slot or any suitable time duration). FIG. 4 illustrates the sidelink resource pool 450 over a certain time period.

As illustrated in FIG. 4, the resources 452 (e.g., time frequency resources) included in the sidelink resource pool 450 are preceded by a channel-access gap 454. The channel-access gap 454 may include the last OFDM symbol in the slot preceding a resource 452 and may also be referred to as a "between-slot medium." In some aspects, a sidelink UE (e.g., UE 215) may utilize a channel-access gap 454 to contend for a COT (e.g., by performing a LBT), to transmit a burst transmission over consecutive slots in the time domain, to perform COT-sharing with another UE, and/or the like. Mechanisms for the usage of a channel-access gap 454 within a shared channel are described in greater detail with reference to FIGS. 4-9, 10A-10B, and 11-13.

According to some aspects, a first UE may reserve a channel-access gap 454 or a portion thereof. For instance, in some aspects, a first UE may append a reservation for a channel-access gap 454 to a reservation (e.g., a legacy reservation) for the PSSCH. In some cases, the reservation may be appended as a single bit (e.g., a 1-bit indication), where a first status of the bit represents reservation of a particular duration of the channel-access gap 454 and a second status of the bit represents no reservation of the channel-access gap 454. In some aspects, a reservation may reserve 25 μs or greater of the channel-access gap 454, for example. Further in some aspects, the first UE may be configured to make the reservation based on a burst transmission configuration, which may configure the first UE based on a number of TBs queued for transmission at the UE, a priority of the queued TBs, a packet delay budget (PDB) of the TBs, a network configuration, and/or the like, as described in greater detail below. To avoid collision, a second UE may sense (e.g., monitor) for such reservations of channel-access gaps during resource selection, as described in greater detail with reference to FIG. 5. In that regard, a UE may select a resource from the sidelink resource pool 450 based on the channel-access gap 454. More specifically, in some aspects, the UE may determine an availability of the channel-access gap 454, and the UE may select the resource based on this availability.

In FIG. 4, three types of channel-access gap availability are shown with respect to a first UE 215. Namely, a first channel-access gap 454a is shown as completely available (e.g., not reserved), a second channel-access gap 454b is shown as having a reservation 460 for a second UE 215, and a third channel-access gap 454c is shown as partially available. In some aspects, the first-channel-access gap 454a may be available for CP extension and/or a type 1 LBT by the first UE, the second channel-access gap 454b may be unavailable for an LBT by the first UE, and the third channel-access gap may be available for a type 2 LBT by the first UE, as described in greater detail below. Further, as described above, the reservation 460 of a channel-access gap may reserve a particular duration of the channel-access gap 454, such as available with a 25 μs or greater. In some aspects, the duration 458 of the channel-access gap 454 may vary based on a network, and in some aspects, the reservation 460 may correspond to a reservation of the entire duration 458 of the channel-access gap.

As described above, the first channel-access gap 454a illustrates an example of a channel-access gap 454 available to a first sidelink UE 215. In particular, the first sidelink UE 215 may identify the resource 452 R1 as being preceded by a channel-access gap that is available (e.g., not reserved). As such, if the resource 452 R1 is not blocked by an ongoing COT, nor another reservation in the same slot, the first sidelink UE may access the resource 452 R1, as well as the first channel-access gap 454a. For instance, the first sidelink UE 215 may, using CP extension, occupy the channel-access gap 454a preceding the resource 452 RE Additionally or alternatively, the first sidelink UE 215 may perform a type 1 LBT in the first channel-access gap 454a before accessing the resource 452 RE In this way, the first sidelink UE 215 may, when using the resource 452 R1, fully occupy the first channel-access gap 454a. Moreover, in the illustrated example, the first sidelink UE 215 may be positioned outside the LBT energy detection (ED) range of a third sidelink UE 215. Accordingly, even if the third sidelink UE 215 previously reserved the resource 452 R2 and/or the first channel-access gap 454a, the first sidelink UE 215 may not sense the reservation. As such, the first sidelink UE 215 may not be blocked from accessing the first channel-access gap 454a by a reservation corresponding to the third sidelink UE 215.

With respect to the second channel-access gap 454b, the first sidelink UE 215 may sense (e.g., detect) a reservation 460 of the second channel-access gap 454b corresponding to another sidelink UE 215 (e.g., the second sidelink UE 215). In some cases, for example, the second sidelink UE 215 may reserve the channel-access gap 454b to perform a type 1 LBT to contend for a COT before using the resource 452 R4 to perform a transmission. If the second sidelink UE 215 is positioned such that the second sidelink UE 215 is in the LBT ED range of the first sidelink UE 215, the first sidelink UE 215 may sense the reservation 460 of the channel-access gap 454b. Accordingly, the first sidelink UE may determine that the resource 452 R3 may be accessed if the first sidelink UE honors the reservation 460 by leaving a gap preceding the resource 452 R3. That is, for example, the first sidelink UE may not perform a CP extension with respect to the resource 452 R3. In some aspects, the first sidelink UE may honor the reservation 460 and/or access the resource 452 R3 by leaving a gap with a particular duration (e.g., at least 25 μs) preceding the resource 452 R3.

The third channel-access gap 454c illustrates an example of a channel-access gap 454c that is partially available to the first sidelink UE 215. In particular, the resource 452 R5 and the resource 452 R6 are reserved for a continuous transmission (e.g., a burst transmission) by another sidelink UE 215 (e.g., a fourth sidelink UE 215). Moreover, in some aspects, the fourth sidelink UE 215 may share a COT associated with the burst transmission with other UEs (e.g., the first UE 215). For instance, the fourth UE 215 may contend for a COT in a channel. The fourth UE 215 may select and reserve the resource 452 R5 based on the channel-access gap 454 preceding the resource 452 R5 having an available (e.g., not reserved) duration satisfying a threshold (e.g., ≥25 μs). For instance, the fourth UE 215 may select and reserve the resource 452 based on the channel-access gap 454 preceding the resource 452 R5 being unreserved. As such, in some aspects, for instance the fourth UE 215 may perform a type 1 LBT during a channel-access gap 454 preceding the resource 452 R5 to contend for the COT, for example. Upon winning the contention, the fourth UE 215 can transmit in the channel during the COT and may also share the COT with other UEs by transmitting a COT sharing indicator (COT-SI). The fourth UE 215 may further perform post extension to transmit over at least a portion 462 of the third channel-access gap 454c, reducing an idle interval on the channel, as described in greater detail with respect to FIGS. 10A-B. In particular, the fourth UE 215 may occupy a portion 462 of the third channel-access gap 454c with a duration suitable to maintain an idle interval on the channel below a threshold (e.g., 25 μs) at which the UE is required to release (e.g., terminate) the COT. Accordingly, a UE may transmit multiple data blocks (e.g., TBs) over consecutive slots in the time domain using post extension, the UE may perform a burst transmission of two or more data blocks (e.g., transport blocks (TBs)) over the resource 452 R5, the portion 462 of the third channel-access gap 454c, and the resource 452 R6, as illustrated. The first UE 215 may not overlap (e.g., access and/or occupy) the portion 462 of the third channel-access gap 454c used for the burst transmission. However, the remaining portion 464 of the third channel-access gap 454c may be available to the first UE 215 to perform a type 2 LBT. The first UE may thus share the fourth UE's COT via a type 2 LBT in the third channel-access gap 454c. In some aspects, the remaining portion 464 of the third channel-access gap 454c is approximately 16 μs. In that regard, the first UE may access the resource 452 R7 and only the 16 μs of the channel-access gap 454c immediately preceding the resource 452 R7. Further, while the resource 452 R5 and the resource R6 are illustrated as being in the same subchannel, a UE may schedule and/or perform a burst transmission over two or more resources in different subchannels, in some aspects. Scheduling a burst transmission over resources in either the same or different subchannels may improve communication efficiency on a channel by increasing the number of resources available for such a transmission in comparison with a burst transmission scheduled over only resources in the same subchannel, for example.

While FIG. 4 is described with respect to a first, second, third, and fourth UE 215, aspects are not limited thereto. To that end, a sidelink resource pool (e.g., sidelink resource pool 450) may be utilized by any number of wireless communication devices. Moreover, the description of the first, second, and third channel-access gaps 454a-c is exemplary and not limiting.

As described above, according some aspects, a sidelink UE may utilize a channel-access gap (e.g., channel-access gap 454) to contend for a COT (e.g., by performing a LBT), to transmit a burst transmission over consecutive slots in the time domain, to perform COT-sharing with another UE, and/or the like. Accordingly, the availability of a channel-access gap (e.g., channel-access gap 454) in a sidelink resource pool (e.g., sidelink resource pool 450) may vary. In that regard, the present disclosure provides techniques for a sidelink UE (e.g., the UEs 115, 215, and/or 215) to perform COT aware autonomous sidelink sensing over a shared radio frequency band (e.g., in a shared spectrum or an unlicensed spectrum). For instance, the present disclosure provides techniques for selecting a resource based on a channel-access gap. In particular, mechanisms for determining the availability of channel-access gaps preceding available resources in the sidelink resource pool (e.g., the sidelink resource pool 450) are disclosed. In some aspects, for example, a sidelink UE sensing in the sidelink resource pool in the shared frequency band may request additional information associated with the available resources so that the sidelink UE may identify a resource as accessible with a channel-access gap preceding the resource being available (not reserved), reserved, or partially available, as illustrated by channel-access gap 454a, 454b, and 454c, respectively. Moreover, in reserving a resource, the sidelink UE may further provide a reservation of a channel-access gap in some cases.

Figure 5:
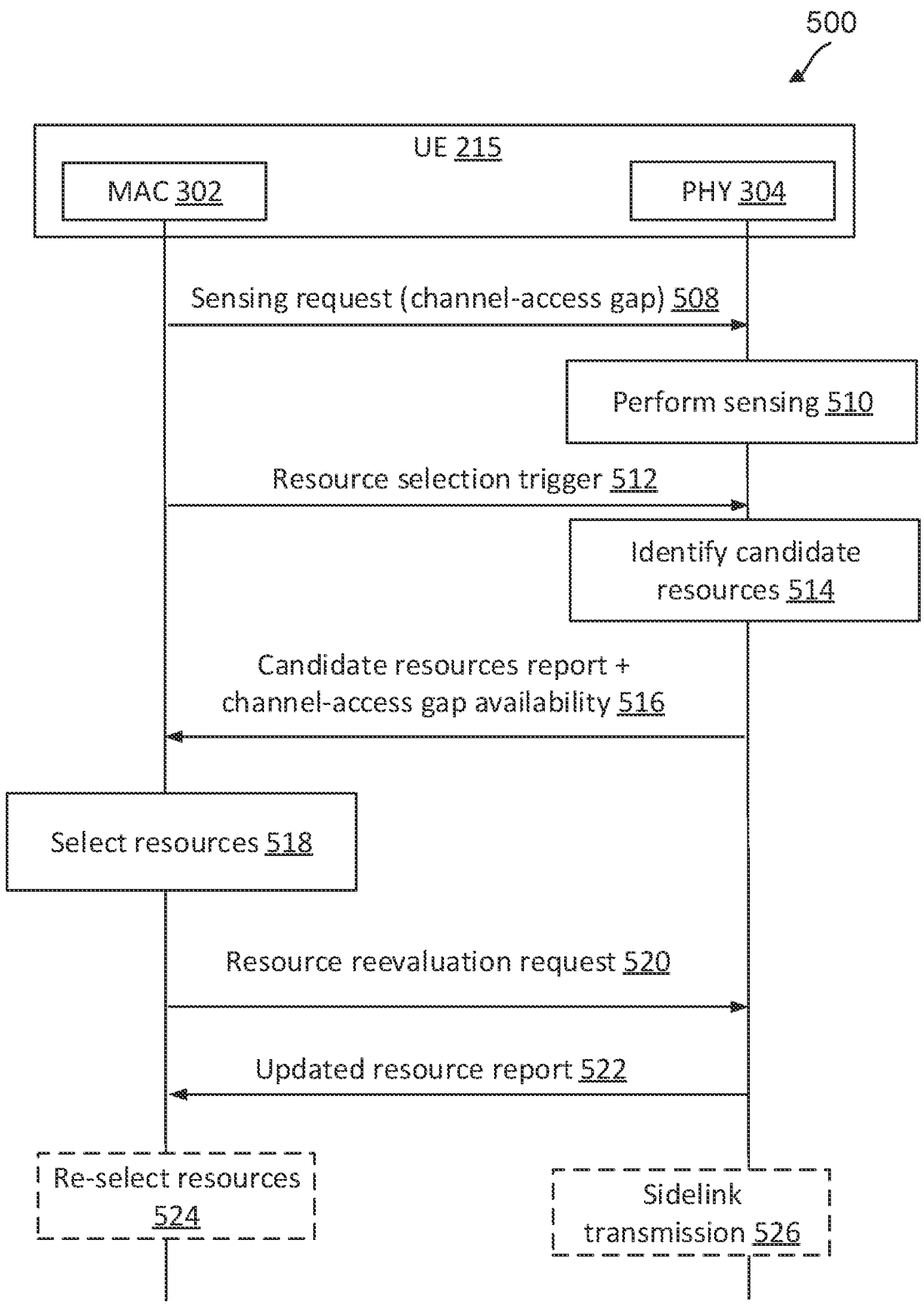
FIG. 5 is a sequence diagram illustrating a channel occupancy time (COT) aware autonomous sidelink sensing method according to some aspects of the present disclosure.

FIG. 5 is a sequence diagram illustrating a COT aware autonomous sidelink sensing method 500 according to some aspects of the present disclosure. The method 500 may be implemented by a UE 215. In particular, the COT aware autonomous sidelink sensing may be implemented between the MAC layer 302 and the PHY layer 304 at the UE 215. Further, the method 500 may be implemented for example, utilizing components as discussed below with respect to the UE 1200 of FIG. 12. As illustrated, the method 500 includes a number of enumerated actions, but embodiments of the method 500 may include additional actions before, after, and in between the enumerated actions. In some embodiments, one or more of the enumerated actions may be omitted or performed in a different order.

Generally speaking, the method 500 includes features similar to method 300 in many respects. For example, actions 310, 314, 316, 318, 320, 322, 324, and 326 are similar to actions 516, 518, 520, 522, 524, 526, 528, and 530, respectively. Accordingly, for sake of brevity, details of those steps will not be repeated here.

At action 508, the MAC layer 302 transmits a sensing request to the PHY layer 304. In particular, the MAC layer 302 transmit a sensing request that includes a request for an indication of the availability of the channel-access gap (e.g., channel-access gap 454) preceding each available resource in a sidelink resource pool within a shared frequency band (e.g., the sidelink resource pool 450 of FIG. 4). The indication of the availability of the channel-access gap may identify a channel-access gap as being unavailable, available for a type 1 LBT by the UE 215, or available for a type 2 LBT by the UE 215, for example. Further, in some aspects, the MAC layer 302 may be configured by the layer 3 (L3) of the UE 215 to perform the COT aware sensing and/or to select one or more resources for a burst transmission. The L3 layer may refer to an upper layer, such as a network layer at the UE 215. In some aspects, the L3 may configure the MAC layer 302 to transmit the sensing request including the request for the indication of the availability of the channel-access gap based on one or more factors, such as a quantity of TBs (e.g., data blocks) included in a buffer (e.g., a data transmission buffer or a memory device) at the UE 215 (e.g., a quantity of TBs queued for transmission at the UE 215), a priority of the TBs included in the buffer, a packet delay budget (PDB) of the TBs, a network configuration, and/or a channel busy ratio (CBR), as described with respect to FIG.

9. Accordingly, the MAC layer 302 may transmit the sensing request to the PHY layer 304 based on the L3 configuration.

At action 510, PHY layer 304 performs sensing in the sidelink resource pool (e.g., the sidelink resource pool 450 of FIG. 4). For instance, the PHY layer 304 may continuously sense or monitor resources (e.g., the resources 452 for FIG. 4) in the sidelink resource pool. The sensing or monitoring may include decoding SCI and/or measuring signal energy in the channel. For SCI decoding, the PHY layer 304 may blindly decode SCI from a PSCCH of each resource. If the decoding is successful, the PHY layer 304 may record the decoded SCI. For signal measurements, the PHY layer 304 may receive a signal from each resource and compute a reference signal received power (RSRP) and/or receive signal strength indicator (RSSI) for each resource. The PHY layer 304 may also record the signal measurements. As described above, a UE may append a reservation of a channel-access gap, such as a 1-bit indication, to a reservation of a resource. Accordingly, the PHY layer may further decode SCI and/or measure signal energy associated with a reservation of a channel-access gap based on the sensing request.

At action 512, the MAC layer 302 sends a resource selection trigger to the PHY layer 304. The MAC layer 302 may transmit the resource selection trigger based on a MAC PDU being generated and ready for transmission.

At action 514, in response to the resource selection trigger, the PHY layer 304 identifies candidate resources from the resource pool (e.g., sidelink resource pool 450) based on the sensing result. In this regard, the PHY layer 304 may identify candidate resources based on decoded SCI and/or signal measurements from sensing (e.g., at action 510). The PHY layer 304 may further identify channel-access gap availability associated with the identified candidate resources. For instance, a sidelink UE may append reservation of a channel-access gap preceding a resource to a reservation of a PSSCH. Accordingly, the PHY layer 304 may, based on the sensing (e.g., at action 510) identify reservation of a channel-access gap, if available. The PHY layer 304 may generate a candidate resources report based on the identified candidate resources and generate an indication of the availability of the channel-access gap. Accordingly, at action 516, the PHY layer 304 may transmit a candidate resource report and the indication of the channel-access gap availability to the MAC layer 302. The report may indicate the time and frequency location information for the candidate resources, and the indication of the channel-access gap availability may indicate the availability of channel-access gaps on a per-resource or a per-slot basis, as described below with reference to FIG. 6.

Figure 6:
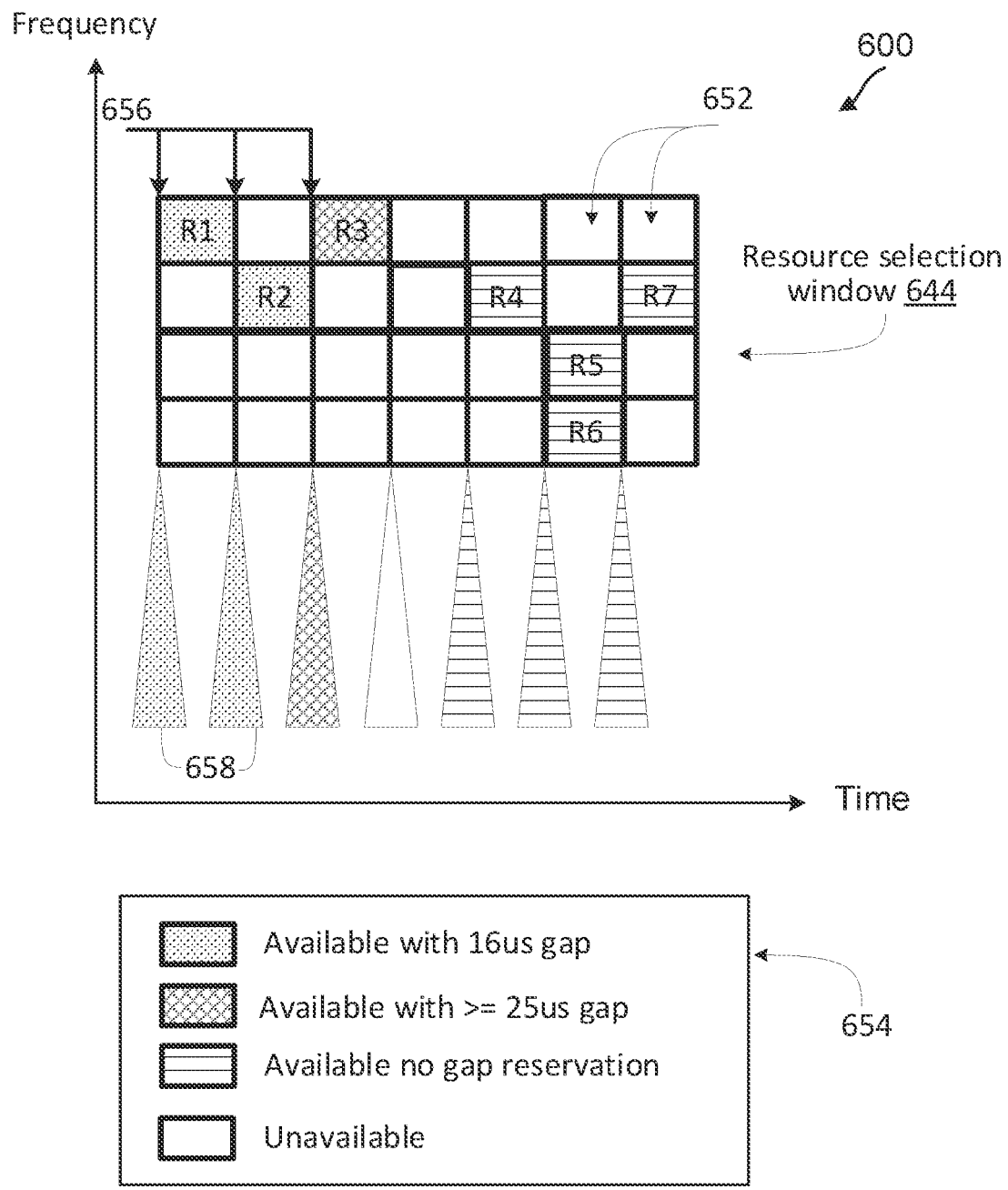
FIG. 6 is a COT aware autonomous sidelink sensing scheme according to some aspects of the present disclosure.

Turning now to FIG. 6, a COT aware autonomous sidelink sensing scheme 600 according to some aspects of the present disclosure is illustrated. The scheme 600 may be employed by the UE 215 or any other UEs such as the UEs 115 and 215. In FIG. 6, the x-axis represents time in some arbitrary units, and the y-axis represents frequency in some arbitrary units.

In the scheme 600, the PHY layer 304 may identify candidate resources from resources 652, which may be similar to the resources 452 of FIG. 4, within the resource selection window 644. The PHY layer 304 may identify the candidate resources by, for example, filtering the resources 652 using a combination of SCI decoding, signal measurements, and/or priority information as discussed above at action 514 of FIG. 5. As an example, the PHY layer 304 may identify the resources 652 R1, R2, R3, R4, R5, R6, and R7 as available and the remaining resources as unavailable after the filtering by SCI decoding, signal measurements, and/or priority information. Further based on the sensing (e.g., action 514), the PHY layer 304 may identify the availability of channel-access gaps preceding the available resources 652 (e.g., R1-R7). To that end, the PHY layer 304 may identify a channel-access gap as being unreserved (e.g., available), partially available, or reserved (e.g., available for a type 1 LBT, available for a type 2 LBT, or unavailable and/or only available for a particular duration, respectively) based on the SCI decoding, signal measurements, and/or priority information. As illustrated, for example, the PHY layer 304 may identify a resource 652 and/or a slot as being accessible with a fully available channel-access gap preceding the resource 652 (e.g., a channel-access gap with no gap reservation 652), with a channel-access gap that is partially occupied and/or reserved preceding the resource (e.g., a resource 652 available with an approximately 16 μs gap), or with a channel-access gap having a reservation thereof preceding the resource 652 (e.g., a resource 652 available with an approximately 25 μs or greater gap). While the durations 16 μs and 25 μs are illustrated, aspects are not limited thereto. In that regard, FIG. 6 is intended to be exemplary and not limiting.

A resource 652 accessible with no gap reservation (e.g., with no reservation in the channel-access gap preceding the resource 652) may be available for CP extension. Additionally or alternatively, a resource 652 accessible with no gap reservation (e.g., a resource following an unreserved channel-access gap) may indicate that the channel-access gap associated with the resource is available for a type 1 LBT. A resource 652 that is accessible with a 16 μs gap and/or a gap of a first duration (e.g., a resource following a channel access gap that is partially reserved) may indicate that the channel-access gap associated with the resource is available for a type 2 LBT. For instance, the resource 652 accessible with a 16 μs gap and/or a gap of a first duration may be available via COT-sharing by the UE 215 with another wireless communication device. Moreover, in some aspects, the 16 μs gap may and/or a gap of the first duration may refer to the portion of the channel-access gap that immediately precedes the resource 652. To that end, a UE reserving the resource 652 may use the 16 μs gap and/or a gap of the first duration (e.g., the channel-access gap is accessible within the 16 μs gap and/or a gap of the first duration) to perform the type 2 LBT to contend for channel access prior to use of the resource 652. Additionally, a resource 652 that is accessible with a 25 μs gap and/or a gap of a second duration (e.g., a resource following a channel access gap that is reserved) may indicate that the channel-access gap associated with the resource 652 was previously reserved by another wireless communication device, such as another UE that made a reservation for a type 1 LBT. The 25 μs gap and/or a gap of a second duration may refer to the portion of the channel-access gap immediately preceding a resource 652 that may not be accessed by the UE 215 such that the UE 215 honors the reservation of the other UE 215. As such, a resource 652 accessible with a 25 μs gap and/or a gap of a second duration may be accessed by a UE 215 if the UE honors the reservation by leaving (e.g., by not occupying) the 25 μs and/or a second duration gap immediately preceding the resource 652.

As further illustrated by FIG. 6, the PHY layer 304 may generate an indication of the availability of channel-access gaps on a per-resource or a per-slot basis. In that regard, the PHY layer 304 may associate a respective channel-access availability with each resource or each available resource (e.g., R1-R7) in the resource selection window 644. To illustrate, each of the available resources 652 (R1-R7) is filled with a respective pattern shown in the legend 654 based on the channel-access availability. In some aspects, the PHY layer 304 may provide such a per-resource indication of availability to the MAC layer 302 (e.g., at action 516 of FIG. 5) by including a set of one or more bits associated with each resource 652 that indicate the respective channel-access availability of the resource 652. Additionally or alternatively, the PHY layer 304 may associate the channel-access availability with slots 656 of the resource selection window 644. To illustrate, FIG. 6 includes indicators 658 of channel-access availability associated with the slots 656 and filled with respective patterns corresponding to the legend 654 based on the availability of a channel-access gap preceding each respective slot 656. In some aspects, the PHY layer 304 may provide such a per-resource indication of availability to the MAC layer 302 (e.g., at action 516 of FIG. 5) by including a set of bits associated with each slot 656 that indicates the respective channel-access availability of the slot 656. For instance, the PHY layer 304 may use a color vector (e.g., a set of multiple bits), where different combinations of bit states are associated with the different channel-access availabilities (e.g., available with no gap reservation, available with a 16 μs gap and/or a gap of a first duration, available with a 25 μs gap or greater and/or a gap of a second duration, or unavailable), to indicate the channel-access availability to the MAC layer 302.

Returning to FIG. 5, at action 518, the MAC layer 302 selects one or more resources from the candidate resources indicated by the candidate resources report received from the PHY layer 304. In particular, the MAC layer 302 selects the one or more resources based on the channel-access gap preceding each of the candidate resources. For instance, the MAC layer 302 may select the one or more resources based on the indication of the availability of the channel-access gap received from the PHY layer 304 on a per-slot and/or a per-resource basis. In that regard, the MAC layer 302 may filter the candidate resources based on the channel-access gap availability associated with the candidate resources. As an illustrative example, the MAC layer 302 may filter the candidate resources so that the MAC layer 302 may select from only candidate resources that are preceded by fully available channel-access gaps (e.g., channel-access gaps with no gap reservation). In another example, the MAC layer 302 may filter the candidate resources so that the MAC layer 302 may select from only candidate resources that are preceded by partially available channel-access gaps (e.g., channel-access gaps accessible within a first duration and/or accessible outside a second duration). Any suitable filtering of the channel-access gap availability is contemplated.

Further, in some cases, the MAC layer 302 may filter and/or select candidate resources to transmit a burst of transport blocks (TBs) (e.g., data blocks) over consecutive time slots, as illustrated and described with respect to resources 452 R5 and R6 in FIG. 4. In such cases, the MAC layer 302 may conduct a leading subchannel based resource selection, as described with reference to FIG. 6.

Turning back now to FIG. 6, to conduct leading subchannel based resource selection, the MAC layer 302 may examine the candidate resources to identify a set of leading resources (e.g., a set of leading subchannels). For instance, to transmit a continuous burst transmission over L consecutive slots, the MAC layer 302 may identify groups of L consecutive resources in the time domain and may identify the leading resources of each of the groups to identify the set of leading resources. As an illustrative example, for a continuous burst transmission over two consecutive slots (e.g., L=2), the MAC layer 302 may identify resources 652 R1, R4, R5, and R6 as leading resources because each of resources 652 R1, R4, R5, and R6 are positioned at the start of a two-slot group for continuous transmission (e.g., [R1, R2], [R4, R5], [R4, R6], [R5, R7], and [R6, R7], respectively). The MAC layer 302 may exclude resource 652 R2 from the set of leading resources because although the resource 652 R3 is available, resource 652 R3 requires a gap greater than or equal to 25 μs. To that end, in some aspects, the UE 215 may not perform a continuous burst transmission over resources 652 R2 and R3 because the UE 215 may forfeit the COT during the idle period (e.g., due to the gap exceeding a threshold) of the channel-access gap between resource 652 R2 and resource 652 R3.

In some aspects, after identifying the set of leading resources, the MAC layer 302 may determine whether the set of leading resources exceeds a minimum size S. In some aspects, the MAC layer 302 may reduce the size L based on the number of identified leading resources failing to satisfy the minimum size S. The MAC layer 302 may then identify groups of consecutive resources based on the reduced value of L and iterate through this process until the minimum size S is satisfied by the identified leading resources. In some cases, the MAC layer 302 may be configured with the size L indicating the number of consecutive slots for the burst transmission and/or the minimum size S. For instance, the MAC layer 302 may be configured by the layer 3 (L3) of the UE 215 with the size of L and/or the minimum size S. Additionally or alternatively, the size of L and/or minimum size S may be configured based on a network setting of the network (e.g., network 100 and/or network 200). Further, in some aspects, the minimum size S varies based on the size L.

In some aspects, after identifying the set of leading resources, the MAC layer 302 may randomly select a leading subchannel for a burst transmission. For instance, the MAC layer 302 may randomly select a first resource from the set of leading resources for transmitting the burst transmission. As an example, if the set of leading resources includes N leading resources, the MAC layer 302 may draw a random number (e.g., k) between 1 and N and select $k^{th}$ leading resource.

In some aspects, the MAC layer 302 may select the leading subchannel based on a prioritization of the leading subchannels. For instance, the MAC layer 302 may prioritize the leading subchannels of the set of leading subchannels based on the number of groups of L consecutive resources in the time domain that begin with the leading subchannels. Continuing with the above example where L=2, the leading resource 652 R1 is associated with a single group (e.g., R1 and R2). In other words, resource 652 R1 has one degree of freedom. Leading resource 652 R4, on the other hand, has two degrees of freedom because resource 652 R4 is the leading resource of two groups of resources (e.g., R4 and R5, as well as R4 and R6). In some aspects, the MAC layer 302 may prioritize the leading resources such that a leading resource leading relatively greater numbers of groups (a greater degree of freedom) have a higher priority than leading resources leading relatively fewer numbers of groups (a lower degree of freedom) and vice versa. Accordingly, the leading resource 652 R4 may have a higher priority than the leading resource 652 R1 in the above example. Further, the MAC layer 302 may select the leading resource with the highest priority. In the case where multiple leading resources share the highest priority, the MAC layer 302 may randomly select a leading resource from among the leading resources with the highest priority. Moreover, in some aspects, the MAC layer 302 may select the leading resource based on priority based on the number of leading resources in the set of identified leading resources exceeding the minimum size S, as described above.

In some aspects, for a continuous burst transmission in the time domain over L consecutive slots, the PHY layer 304 may filter the candidate resources (e.g., identified at action 514 of FIG. 5) based on the size L. For instance, in some aspects, the candidate resources report transmitted by the PHY layer 304 (e.g., at action 516) may include only candidate resources included in a group of L consecutive slots in the time domain. As an illustrative example, the resource 652 R3 of FIG. 6 may be excluded from such a candidate resources report because although the resource 652 R3 is available, the resource 652 R3 is not eligible for a burst transmission over L continuous slots in the time domain, as described above. In such cases, the MAC layer 302 may select one or more resources based on the filtered candidate resources included in the candidate resource report.

In some aspects, the PHY layer 304 may determine the size L based on the MAC layer 302. In some aspects, the MAC layer 302 may transmit an indication of the size of L in the sensing request (e.g., at action 508 of FIG. 5), for example. Additionally or alternatively, the PHY layer 304 may be configured with the size of L.

Figure 7:
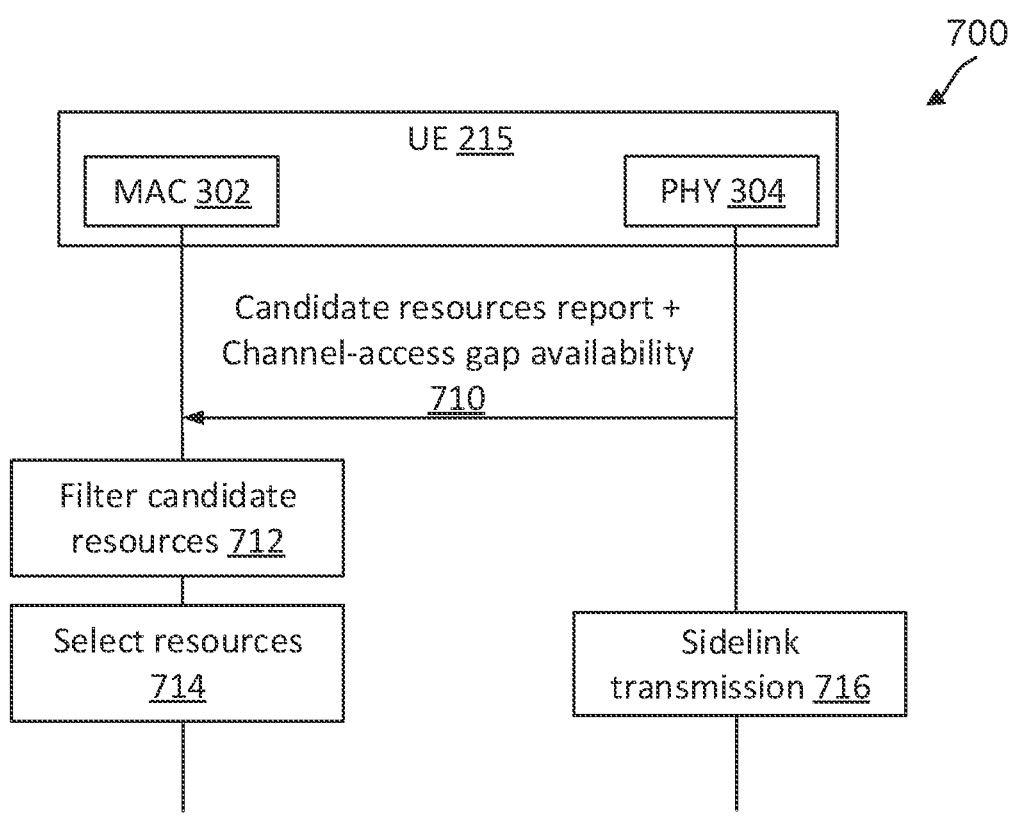
FIG. 7 is a sequence diagram of a method for filtering candidate resources for a burst transmission according to some aspects of the present disclosure.

In some aspects, the MAC layer 302 may filter the candidate resources indicated in the candidate resource report based on the size L. Referring now to FIG. 7, a sequence diagram of a method 700 for filtering candidate resources based on a size L of a burst transmission is illustrated. The method 700 may be implemented by a UE 215. Further, the method 700 may be implemented utilizing components as discussed below with respect to the UE 1200 of FIG. 12. The method 700 can be implemented in conjunction with the method 500 discussed above with respect to FIG. 5. As illustrated, the method 700 includes a number of enumerated actions, but embodiments of the method 700 may include additional actions before, after, and in between the enumerated actions. In some embodiments, one or more of the enumerated actions may be omitted or performed in a different order.

In the method 700, the UE 215 may perform sensing (at the PHY layer 304) and identify candidate resources within a resource selection window, as well as a channel-access gap availability, based on past sensing results in a sensing window using similar mechanisms discussed above in relation to FIG. 5. At action 710, the PHY layer 304 sends a candidate resource report indicating the identified candidate resources within a resource selection window, as well as an indication of a channel-access gap availability.

At action 712, upon receiving the candidate resource report, the MAC layer 302 filters the candidate resources based on the size L of a burst transmission. For instance, the MAC layer 302 may exclude any resource in the candidate resources that are not included in a group of L consecutive resources in the time domain. The MAC layer 302 may further exclude non-leading resources that are preceded by a gap of 25 μs or greater (e.g., by a reserved channel-access gap).

In some aspects, the MAC layer 302 may be configured with the size L. For instance, the MAC layer 302 may be configured by the layer 3 (L3) of the UE 215 with the size of L. Additionally or alternatively, the size of L may be configured based on a network setting of the network (e.g., network 100 and/or network 200).

At action 714, the MAC layer 302 selects one or more resources from the filtered candidate resources. In particular, the MAC layer 302 selects a leading resource from among the filtered candidate resources, as described above with reference to FIG. 6.

At action 716, the UE 215 may perform a sidelink transmission using the selected leading resource. In some aspects, the UE 215 may perform a burst transmission over two or more resources in a group of consecutive resources in the time domain beginning with the leading resource. The sidelink transmission is described in greater detail below with reference to at least action 526 of FIG. 5.

Referring now to FIG. 5, at action 520, the MAC layer 302 sends a resource reevaluation request to the PHY layer 304. The resource reevaluation request may request the PHY layer 304 to report updated available resources at this time instant to double check whether the previously selected resources are still available. In some instances, the MAC layer 302 may send the resource reevaluation request slightly before (e.g., 1 symbol, 2 symbols, 3 symbols, 4 symbol, or a slot) the actual time where the MAC PDU is to be transmitted using the selected leading resource. As such, the resource reevaluation request can also be referred to as a "last-minute re-evaluation". In some aspects, the UE 215 may use a single resource reevaluation request for each of the resources included in a group of consecutive resources in the time domain lead by the leading resource. In this way, the MAC layer 302 may trigger a last-minute re-evaluation of a group of resources slightly before the leading resource, as illustrated in FIG. 8.

Figure 8:
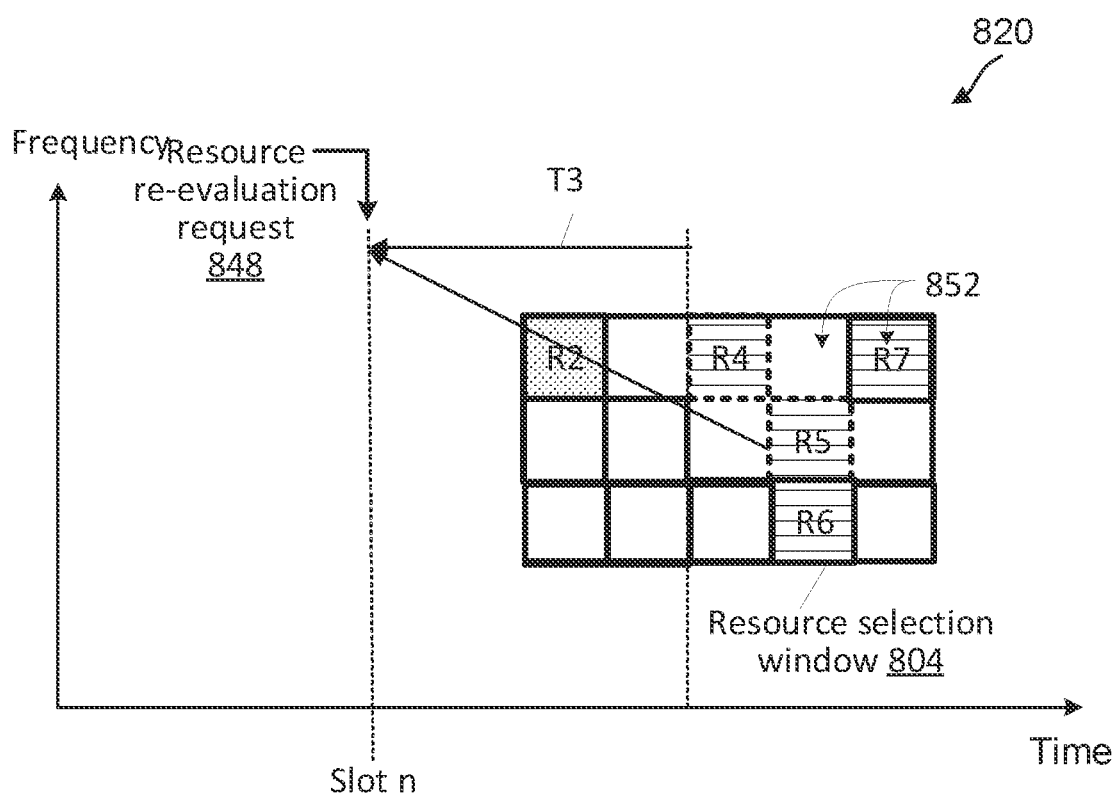
FIG. 8 is a resource reevaluation scheme according to some aspects of the present disclosure.

Turning now to FIG. 8, a resource reevaluation scheme 820 according to some aspects of the present disclosure is illustrated. The scheme 820 may be employed by the UE 215 or any other UEs such as the UEs 115 and 215. In FIG. 8, the x-axis represents time in some arbitrary units, and the y-axis represents frequency in some arbitrary units. As further illustrated, the scheme 820 includes a resource selection window 804, which may be similar to the resource selection window 644 of FIG. 6 and is illustrated using the same resource pool structure as FIG. 6. Moreover, the resources 852 may be similar to the resources 652.

As illustrated, the MAC layer 302 sends a resource reevaluation request 848 at T3 duration before the actual transmission time for a selected leading resource. In FIG. 8, the dashed outline of the leading resource 852 R4 identifies the leading resource 852 R4 as the selected leading resource. In some aspects, the T3 duration may have a predetermined or preconfigured lower bound and/or upper bound. As further illustrated, in some aspects, the resource reevaluation request 848 may be associated with a group of resources lead by the leading resource. To that end, the resource reevaluation request 848 may trigger re-evaluation of the group of resources by the PHY layer 304 at T3 duration before the leading resource. As an illustrative example, for a burst transmission size L=2, the resource 852 R4 leads a group of resources including R4 and R5, as indicated by the dashed outline. Accordingly, the illustrated resource re-evaluation request 848 triggers last-minute re-evaluation of both resource 852 R4 and resource R5 at the T3 duration before the selected resource 852 R4.

Referring to FIG. 5, at action 522, in response to the resource reevaluation request, the PHY layer 304 sends an updated resource report to the MAC layer 302. The PHY layer 304 may identify whether the leading resource and resources in a group led by the leading resource are still available at the time instant when the resource reevaluation request is received. In this way, the PHY layer 304 may re-evaluate the availability of the leading resource, as well as other resources within the group based on the resource reevaluation request. In some aspects, the PHY layer 304 may use substantially similar mechanisms as discussed at action 514 to identify available resources (candidate resources) at that time instant. If the leading resource previously selected by the MAC layer 302 is no longer available, the PHY layer 304 may provide an indication in the report. For instance, the report may include a re-selection flag set to 1 for the leading resource. Similarly, if a non-leading resource within the group lead by the leading resource is no longer available, the PHY layer 304 may provide an indication in the report. For instance, the report may include a re-selection flag set to 1 for any unavailable non-leading resource.

At action 524, the MAC layer 302 may optionally re-select a resource, if necessary. In particular, if the MAC layer 302 determines that the leading resource is no longer available based on the updated resource report, the MAC layer 302 may re-select a leading resource from among candidate resources indicated in the updated resources. The MAC layer 302 may re-select the leading resource using substantially similar mechanisms as discussed at action 518. As such, the group of resources used to perform a sidelink transmission may be altered. Moreover, the UE 215 may repeat the action 520 and 522 at a later time for another last-minute resource reevaluation for newly selected leading resource.

In some aspects, if the MAC layer 302 determines, based on the updated resource report, that the leading resource remains available but that one or more of the non-leading resources in a group led by the leading resource are not available, the MAC layer 302 may alter the group of resources used to perform a sidelink transmission. In particular, the MAC layer 302 may re-select a group of resources to perform the sidelink transmission based on the updated resource report and using substantially similar mechanisms as discussed at action 518. To that end, the MAC layer 302 may re-select a leading resource. Moreover, the UE 215 may repeat the action 520 and 522 at a later time for another last-minute resource reevaluation for newly selected leading resource.

In some aspects, if a non-leading resource is identified as unavailable (e.g., in the updated resources report), the MAC layer 302 may transmit a partial burst. More specifically, for a group of consecutive resources in the time domain lead by a leading resource, the MAC layer 302 may transmit a first portion (e.g., one or more TBs or data blocks) of a burst transmission using the resources available in the group. Further, the MAC layer 302 may refrain from transmitting a second portion of the burst transmission. The UE 215 may return the TBs (e.g., data blocks) of the second portion of the burst transmission to a data buffer so that the second portion of the burst transmission is queued for an alternative transmission.

In some aspects, if a non-leading resource is identified as unavailable (e.g., in the updated resources report), the MAC layer 302 may identify a replacement non-leading resource. For instance, in some cases, the MAC layer 302 may replace a non-leading resource in a first group lead by the leading resource with a non-leading resource in a corresponding slot in a second group lead by the leading resource. As an illustrative example, the MAC layer 302 may identify the resource 852 R6 shown in FIG. 8 as a replacement resource for the resource 852 R5. Further, in some cases, the MAC layer 302 may identify a replacement non-leading resource that may have previously been identified as unavailable at action 514 (e.g., in the candidate resources report) and that, upon last-minute re-evaluation, was identified as being available in the updated resource report. In some aspects, the MAC layer 302 may attempt to replace an unavailable non-leading resource based on one or more factors. For instance, the MAC layer 302 may attempt to identify a replacement non-leading resource based on a priority of the burst transmission (e.g., the TBs within the burst transmission) exceeding a threshold and/or a quantity or percentage (e.g., of a group of resources for a burst transmission) of the unavailable non-leading resources remaining below a threshold. In some aspects, if the priority of the burst transmission fails to satisfy the threshold and/or the quantity and/or percentage of unavailable non-leading resources fails to satisfy the threshold, the MAC layer 302 may transmit a partial burst or re-select a group of resources to perform the sidelink transmission, as described above.

At action 526, the PHY layer 304 performs a sidelink transmission. In particular, the PHY layer 304 transmits one or more data blocks (e.g., TBs) to a second UE. The PHY layer 304 performs the sidelink transmission using a group of resources lead by a selected leading resource and identified as available (e.g., via the updated resource report at action 522).

Figure 9:
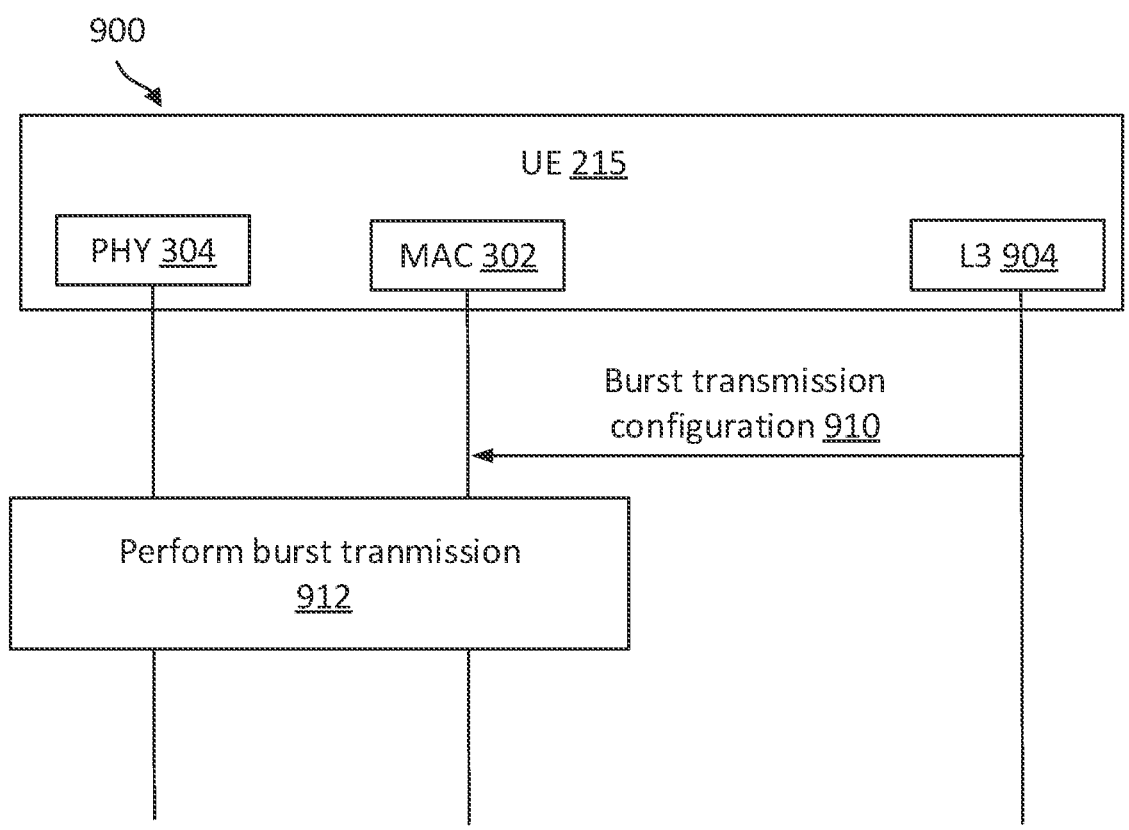
FIG. 9 is a sequence diagram illustrating a burst transmission configuration method according to some aspects of the present disclosure.

FIG. 9 is a sequence diagram illustrating a burst transmission configuration method 900 according to some aspects of the present disclosure. The method 900 may be implemented by a UE 215, for example, utilizing components as discussed below with respect to the UE 1200 of FIG. 12. In particular, the burst transmission configuration method 900 may be used to configure the MAC layer 302 of the UE 215 to request an indication of a channel-access gap availability, as well as select resources to perform a burst transmission, as described herein. As illustrated, the method 900 includes a number of enumerated actions, but embodiments of the method 900 may include additional actions before, after, and in between the enumerated actions. In some embodiments, one or more of the enumerated actions may be omitted or performed in a different order.

At action 910, the L3 904 of the UE 215 may transmit a burst transmission configuration to the MAC layer 302 of the UE 215. The L3 904 may refer to the network layer of the UE 215. Further, the burst transmission configuration may configure the MAC layer 302 to select one or more resources to perform a burst transmission. In some aspects, the L3 904 may receive the burst transmission configuration from a BS 205 (e.g., via RRC signaling or medium access control-control element (MAC-CE) signaling).

For instance, in some aspects, the burst transmission configuration may configure the MAC layer 302 to perform one or more actions of the method 500 and/or method 700. For instance, the burst transmission configuration may configure the MAC layer 302 to transmit a sensing request that includes a request for an indication of the availability of the channel-access gap preceding each of the available resources (e.g., at action 508 of method 500). Moreover, the burst transmission configuration may configure the MAC layer 302 to select the resources based on the indication of channel-access availability (e.g., at action 518 of the method 500 and/or at action 714 of the method 700). In particular, the burst transmission configuration may configure the MAC layer 302 with the number of slots L for a continuous burst transmission. Accordingly, the burst transmission configuration may configure the MAC layer 302 to select a leading resource based on the size L of a group of consecutive slots in the time domain. In particular, the burst transmission configuration may configure the MAC layer 302 to filter candidate resources based on the size L (e.g., at action 712 of the method 700). Additionally or alternatively, the burst transmission configuration may configure the MAC layer 302 to transmit an indication of the size L to the PHY, in some cases. For instance, the MAC layer 302 may be configured to transmit an indication of the size L to the PHY layer 304 via a sensing request or a resource selection trigger, and the PHY layer 304 may be configured to filter the resources provided in the candidate resource report based on the received size L (e.g., at action 514 of the method 500). Further, the burst transmission configuration may configure the MAC layer 302 with a minimum size S for a set of leading resources identified based on candidate resources included in a candidate resource report (e.g., at action 518 of method 500). That is, for example, the burst transmission configuration may configure the MAC layer 302 with a minimum quantity of leading resources to be identified from a set of candidate resources. The burst transmission configuration may further configure the MAC layer 302 to reduce the size L based on the number of identified leading resources failing to satisfy the minimum size S. In some aspects, the burst transmission configuration may configure the MAC layer 302 so that the minimum size S varies based on the size L.

The burst transmission configuration may further configure the MAC layer 302 to perform the one or more actions of the method 500 and/or the method 700 based on one or more factors. The one or more factors may include a quantity of TBs (e.g., data blocks) stored at a buffer (e.g., a data transmission buffer or a memory device) at the UE 215 (e.g., a quantity of TB s queued for transmission at the UE 215), a priority of the TBs included in the buffer, a packet delay budget (PDB) of the TBs, a network configuration, and/or a channel busy ratio (CBR). In some aspects, for example, the burst transmission configuration may configure the MAC layer 302 to perform the one or more action of the method 500 and/or the method 700 (e.g., to attempt a burst transmission) based on the quantity of TBs queued for transmission at the UE 215 exceeding a threshold. In some aspects, the burst transmission configuration may configure the MAC layer 302 to attempt the burst transmission based on the priority of one or more of the TBs included in the buffer (e.g., queued for transmission) satisfying a threshold. For instance, the MAC layer 302 may be configured to attempt the burst transmission based on at least one queued TB having a priority exceeding a first threshold, the number of queued TBs that satisfy a second threshold exceeding a threshold, or both. In some aspects, the burst transmission configuration may configure the MAC layer 302 to attempt the burst transmission based on at least one queued TB being within a threshold of approaching a PDB. In some aspects, the burst transmission configuration may configure the MAC layer 302 to attempt the burst transmission based on a network configuration indicating and/or enabling frequency division multiplexing (FDM) COT-sharing on the network (e.g., network 100 and/or network 200). Further, in some aspects, the burst transmission configuration may configure the MAC layer 302 to attempt the burst transmission based on a channel busy ratio (CBR) satisfying a threshold.

Additionally or alternatively, any of the thresholds associated with the above factors of (e.g., the quantity of queued TBs for transmission, the priority of queued TBs, the PDB of the TBs) may depend on the CBR. In some aspects, for example, relatively lower CBRs (e.g., indicating relatively less busy channels) may be associated with relatively greater burst transmission opportunities and/or a relatively longer duration of time for attempting to perform burst transmissions, while relatively higher CBRs (E.g., indicating relatively more congested channels) may be associated with relatively fewer burst transmission opportunities and/or a relatively shorter duration of time for attempting to perform burst transmissions. In that regard, the burst transmission configuration may configure the MAC layer 302 so that for relatively lower CBRs, the MAC layer 302 may attempt a burst transmission based on the number of queued TBs for transmission satisfying a relatively lower threshold, the priority of one or more of the queued TBs satisfying a relatively lower threshold, and/or a queued TB being within a relatively greater threshold approaching a PDB. The burst transmission configuration may further configure the MAC layer 302 so that for relatively greater CBRs, the MAC layer 302 may attempt a burst transmission based on the number of queued TBs for transmission satisfying a relatively greater threshold, the priority of one or more of the queued TBs satisfying a relatively greater threshold, and/or a queued TB being within a relatively lower threshold approaching a PDB.

At action 912, the MAC layer 302 and the PHY layer 304 may perform or attempt to perform a burst transmission based on the burst transmission configuration received from the L3 904. For instance, based on the burst transmission configuration, the MAC layer 302 and the PHY layer 304 may perform one more actions of method 500 of FIG. 5 and/or method 700 of FIG. 7.

Figure 10B:
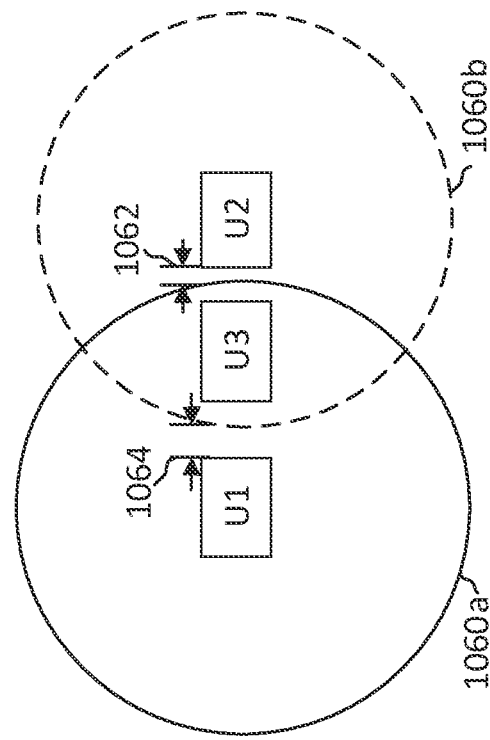
FIG. 10B illustrates a listen-before-talk energy detection (LBT ED) range of wireless communication devices according to some aspects of the present disclosure.
Figure 10A:
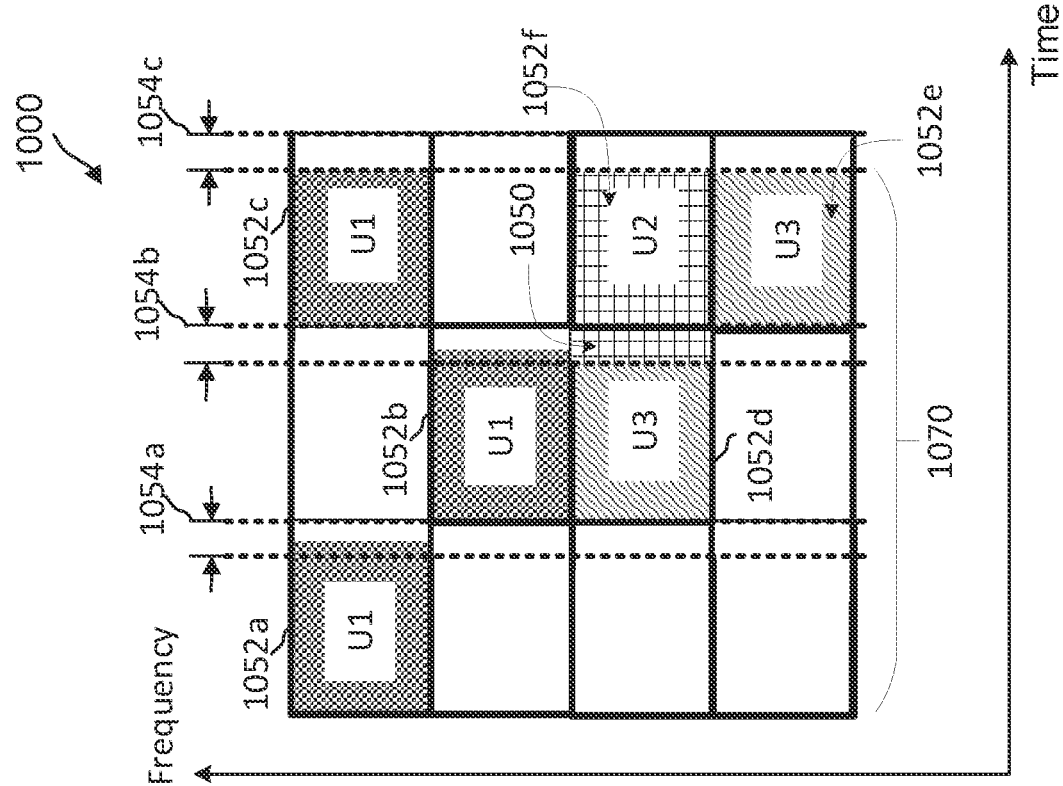
FIG. 10A is a sidelink resource pool in a shared frequency band according to some aspects of the present disclosure.

FIGS. 10A and 10B are discussed in relation to each other to illustrate post extension. FIG. 10A illustrates a sidelink resource pool 1000 in a shared frequency band according to some aspects of the present disclosure. The sidelink resource pool 1000 may be employed by the UE 215 or any other UEs such as the UEs 115 and 215. In FIG. 10A, the x-axis represents time in some arbitrary units, and the y-axis represents frequency in some arbitrary units.

The sidelink resource pool 1000 may span a certain frequency bandwidth in an unlicensed band or shared frequency band. As shown, the sidelink resource pool 1000 may include a plurality of time-frequency resources 1052, which may be similar to the time-frequency resources 452 of FIG. 4. Each resource 1052 may include a certain number of symbols (e.g., OFDM symbols) in time and a certain number of frequency subcarriers in frequency. In some aspects, the resource 1052 may be in units of RBs (e.g., including 12 consecutive subcarriers in frequency and a time duration of a slot or any suitable time duration). FIG. 10A illustrates the sidelink resource pool 1000 over a certain time period. As further, illustrated in FIG. 10A, the resources 1052 (e.g., time frequency resource) included in the sidelink resource pool 1000 are preceded by a channel-access gap 1054, which may be similar to the channel-access gap 454 of FIG. 4. The channel-access gap 1054 may include the last OFDM symbol in the slot preceding a resource 1052 and may also be referred to as a "between-slot medium."

In some aspects, a UE (e.g., UE 115 and/or UE 215) may utilize a channel-access gap 1054 to perform post extension. More specifically, the UE may perform a sidelink transmission using a resource 1052 and a channel-access gap 1054 following the resource 1052. Using the resource 1052 and the channel-access gap 1054 following the resource 1052, the UE may transmit two or more data blocks (e.g., TBs) for the sidelink transmission. For instance, in some aspects, the UE may transmit the sidelink transmission further using an additional resource 1052, where the channel-access gap 1054 is positioned between the resource 1052 and the additional resource 1052. Accordingly, the two or more data blocks may be transmitted over a combination of the resource 1052, the channel-access gap 1054, and the additional resource 1052.

As an illustrative example of post extension, a first UE 215 (illustrated as U1) may perform a burst transmission over a first resource 1052a, a second resource 1052b, and a third resource 1052c, as well as a first channel-access gap 1054a and a second channel-access gap 1054b. To that end, the first UE 215 may transmit two or more data blocks (e.g., TBs) over the resources 1052a-c and the channel-access gaps 1054a-b. Further, in this illustrated example, the first UE 215 may perform post extension to use the first channel-access gap 1054 and the second channel-access gap 1054 for transmission.

In some aspects, a UE may perform post extension after determining, based on a last-minute re-evaluation (e.g., at action 520 of method 500), that a group of consecutive resources in the time domain is available for a burst transmission and that at least a portion of a channel-access gap 1054 between resources within the group is at least partially available. For instance, with respect to the illustrated example, the first UE 215 U1 may perform the post extension into the first channel-access gap 1054a and the second channel-access gap 1054b after determining that the group of resources 1054a-c is available for transmission and the first and second channel-access gaps (1054a and 1054b, respectively) are each at least partially available. In that regard, while the second channel-access gap 1054b is illustrated as having a reservation 1050 for a second UE 215 U2, the first UE 215 U1 may not detect the reservation 1050 because the second UE 215 U2 is not within the LBT ED range of the first UE 215 U1, as illustrated in FIG. 10B.

FIG. 10B illustrates the LBT ED range 1060a of the first UE 215 U1, as well as the LBT ED range 1060b of the second UE 215 U2, with respect to the first UE 215 U1, the second UE 215 U2, and a third UE 215 U3. As illustrated, the LBT ED range 1060a of the first UE 215 U1 reaches the third UE 215 U3. However, the second UE 215 U2 is spaced from the LBT ED range 1060a of the first UE 215 U1 by a distance 1062. As further illustrated, while the first UE 215 U1 is spaced from the LBT ED range 1060b of the second UE 215 U2 by a distance 1064, the LBT ED range 1060b of the second UE 215 U2 reaches the third UE 215 U3. Accordingly, the third UE 215 U3 may detect a reservation (e.g., via SCI decoding) of a resource 1052 and/or a channel-access gap 1054 made by either the first UE 215 U1 or the second resource UE 215 U2. On the other hand, the second UE 215 U2 may not detect a reservation of a resource 1052 and/or a channel-access gap 1054 made by the first UE 215 U1, and the first UE 215 U1 similarly may not detect a reservation of a resource 1052 and/or a channel-access gap 1054 made by the second UE 215 U2.

Referring again to FIG. 10A, because the second UE 215 U2 is not within the LBT ED range of the first UE 215 U1 and the resources 1052a-c and channel-access gaps 1054a-b are otherwise available, the first UE 215 U1 may transmit a burst transmission using post extension over the resources 1052a-c and the channel-access gaps 1054a-b. Further, in some aspects, the first UE 215 U1 may indicate that the COT 1070 used to perform the burst transmission is available for sharing. For instance, the first UE 215 may transmit a COT-structure indicator (COT-SI) at the beginning of the COT 1070, and the COT-SI may indicate COT sharing information, such as a remaining duration in the COT 1070 for sharing with another sidelink UE. By transmitting the COT-SI in the first resource 1052a in the illustrated example, the third UE 215 U3 may, based on monitoring for the COT-SI, determine that the first UE 215 U1 is sharing its COT 1070. Accordingly, the third UE 215 U3 may share the COT 1070 by transmitting over one or more resources 1052 included in the COT 1070. For instance, the third UE 215 U3 may transmit over a fourth resource 1052d and a fifth resource 1052e within the COT 1070 based on determining that the COT 1070 is available for sharing.

Moreover, in some aspects, by using post extension in the channel-access gaps 1054a-b, the first UE 215 may occupy the channel over the COT 1070 (e.g., up to a maximum channel occupancy time (MCOT)) without forfeiting (e.g., releasing) the COT 1070. For instance, in some aspects, a node (e.g., a radio access technology (RAT)) may be required to terminate a COT after an idle interval greater than or equal to 25 µs on the channel. Further, in some aspects, a channel-access gap 1054 may have a duration of 25 µs or greater, so by at least partially occupying the channel-access gap 1054, the first UE 215 U1 may avoid an idle interval that may end the COT 1070. Additionally, by partially occupying a channel-access gap 1054 (e.g., the channel-access gaps 1054a-b), the first UE 215 U1 may leave an opportunity for the third UE 215 U3 or another sidelink UE 215 to perform a LBT. In particular, to transmit over the resources (e.g., the fourth resource 1052d and the fifth resource 1052e), the third UE 215 U3 may first perform a type 2 LBT. The third UE 215 U3 may perform the type 2 LBT in the portion of the channel-access gap 1054a unoccupied by the first UE 215 U1. To that end, by performing post extension into a channel-access gap 1054 following a resource 1052, the first UE 215 U1 may leave the portion of the channel-access gap 1054 preceding an available resource 1052 in a subsequent slot free for a type 2 LBT. CP extension by the first UE 215 U1 from the subsequent slot into the channel-access gap 1054, on the other hand, may block access to the portion of the channel-access gap 1054 immediately preceding the available resource for another sidelink UE to perform a type 2 LBT.

While the third UE 215 U3 may utilize a portion of the channel-access gap 1054a, the third UE 215 U3 may not perform a CP extension to utilize a portion of the channel-access gap 1054b in the illustrated example. To that end, because the first UE 215 U1 and the second UE 215 U2 are not within the LBT ED range of one another, as illustrated by FIG. 10B, each of the first UE 215 U1 and the second UE 215 U2 may occupy at least a portion of the channel-access gap 1054b. For instance, the first UE 215 U1 may perform post extension in a portion of the channel-access gap 1054b, and the second UE 215 U2 may have reserved the channel-access gap 1054b to perform a type 1 LBT before transmitting over the resource 1052f. The third UE 215 U3, on the other hand, is in both the LBT ED range 1060a of the first UE 215 U1 and the LBT ED range 1060b of the second UE 215 U2. As such, the third UE 215 U3 may be blocked by the reservation 1050 of the channel-access gap 1054b by the second UE 215 U2 from using the portion of the channel-access gap 1054b unoccupied by the first UE 215 U1.

Figure 11:
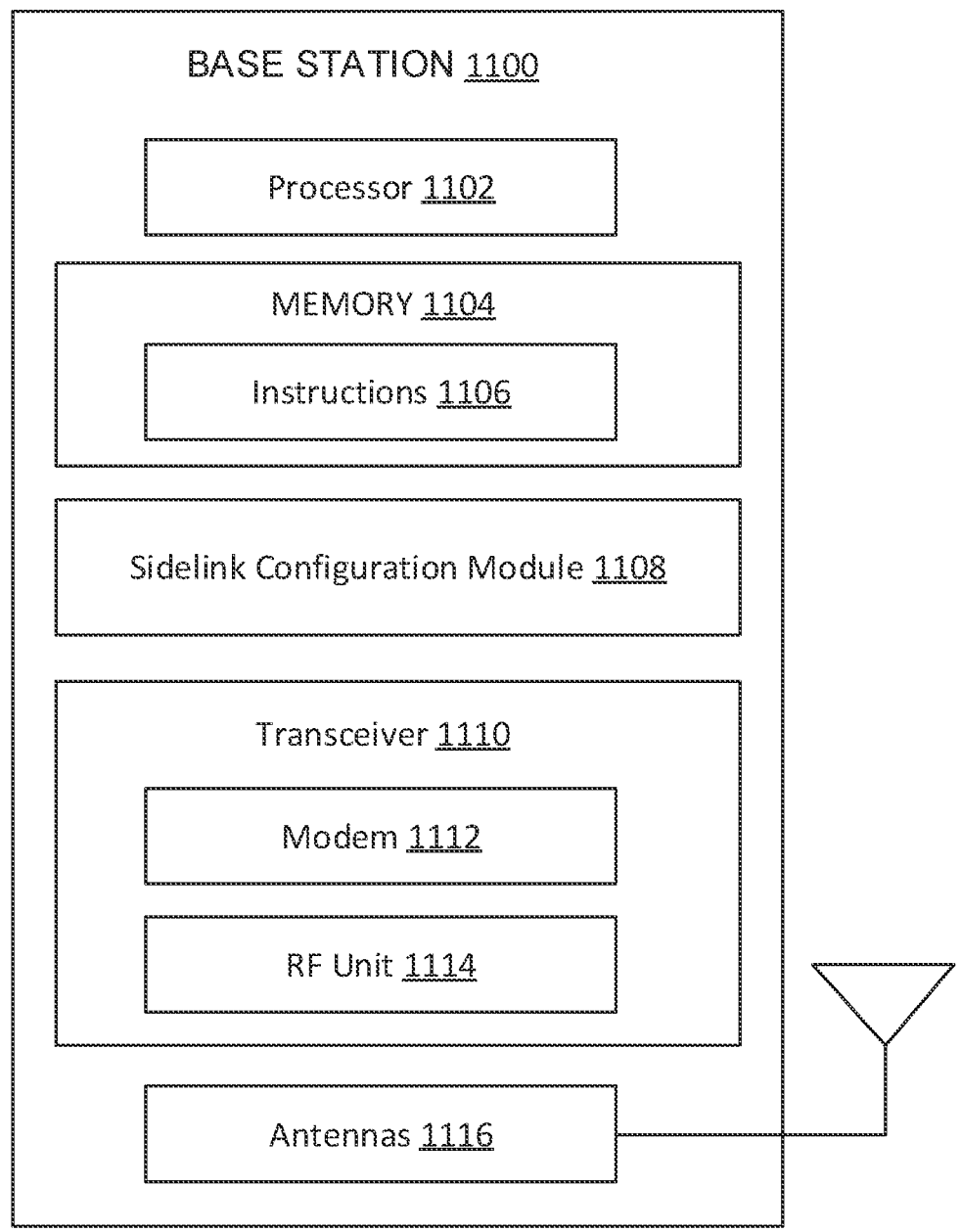
FIG. 11 is a block diagram of an exemplary base station (BS) according to some aspects of the present disclosure.

FIG. 11 is a block diagram of an exemplary BS 1100 according to some aspects of the present disclosure. The BS 1100 may be a BS 105 in the network 100 as discussed above in FIG. 1. A shown, the BS 1100 may include a processor 1102, a memory 1104, a sidelink configuration module 1108, a transceiver 1110 including a modem subsystem 1112 and a RF unit 1114, and one or more antennas 1116. The term "coupled" may refer to directly or indirectly coupled or connected to one or more intervening elements. For instance, these elements may be in direct or indirect communication with each other, for example via one or more buses.

The processor 1102 may have various features as a specific-type processor. For example, these may include a CPU, a DSP, an ASIC, a controller, a FPGA device, another hardware device, a firmware device, or any combination thereof configured to perform the operations described herein. The processor 1102 may also be implemented as a combination of computing devices, e.g., a combination of a DSP and a microprocessor, a plurality of microprocessors, one or more microprocessors in conjunction with a DSP core, or any other such configuration.

The memory 1104 may include a cache memory (e.g., a cache memory of the processor 1102), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 1104 may include a non-transitory computer-readable medium. The memory 1104 may store instructions 1106. The instructions 1106 may include instructions that, when executed by the processor 1102, cause the processor 1102 to perform operations described herein, for example, aspects of FIGS. 1-2. Instructions 1106 may also be referred to as program code. The program code may be for causing a wireless communication device to perform these operations, for example by causing one or more processors (such as processor 1102) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The sidelink configuration module 1108 may be implemented via hardware, software, or combinations thereof. For example, the sidelink configuration module 1108 may be implemented as a processor, circuit, and/or instructions 1106 stored in the memory 1104 and executed by the processor 1102. In some examples, the sidelink configuration module 1108 can be integrated within the modem subsystem 1112. For example, the sidelink configuration module 1108 can be implemented by a combination of software components (e.g., executed by a DSP or a general processor) and hardware components (e.g., logic gates and circuitry) within the modem subsystem 1112.

The sidelink configuration module 1108 may communicate with one or more components of the BS 1100 to perform for various aspects of the present disclosure, for example, aspects of FIGS. 1-2. The sidelink configuration module 1108 is configured to configure a UE (e.g., the UEs 115, 215) with a sidelink configuration (e.g., a sidelink resource pool 450, as shown in FIG. 4) for sidelink communications and/or a configuration for COT aware autonomous sidelink sensing while the UE is in a coverage of the BS 1100. For instance, in some aspects, the sidelink configuration module 1108 may configure the UE with a burst transmission configuration so that the UE attempts to perform burst transmission based on one or more factors, such as a quantity of TBs (e.g., data blocks) included in a buffer (e.g., a data transmission buffer) at the UE (e.g., a quantity of TBs queued for transmission at the UE), a priority of the TBs included in the buffer, a packet delay budget (PDB) of the TBs, a network configuration, and/or a channel busy ratio (CBR). The burst transmission configuration may further configure the UE with a size L for the burst transmission (e.g., a number of slots for the transmission) and/or a minimum size S indicating the minimum number of leading resources to be identified for the size L burst transmission.

As shown, the transceiver 1110 may include the modem subsystem 1112 and the RF unit 1114. The transceiver 1110 can be configured to communicate bi-directionally with other devices, such as the UEs 115 and/or another core network element. The modem subsystem 1112 may be configured to modulate and/or encode data according to a MCS, e.g., a LDPC coding scheme, a turbo coding scheme, a convolutional coding scheme, a digital beamforming scheme, etc. The RF unit 1114 may be configured to process (e.g., perform analog to digital conversion or digital to analog conversion, etc.) modulated/encoded data (e.g., RRC configuration, sidelink resource pool configurations, LBT aware autonomous sensing configuration) from the modem subsystem 1112 (on outbound transmissions) or of transmissions originating from another source such as a UE 115. The RF unit 1114 may be further configured to perform analog beamforming in conjunction with the digital beamforming. Although shown as integrated together in transceiver 1110, the modem subsystem 1112 and/or the RF unit 1114 may be separate devices that are coupled together at the BS 105 to enable the BS 105 to communicate with other devices.

The RF unit 1114 may provide the modulated and/or processed data, e.g. data packets (or, more generally, data messages that may contain one or more data packets and other information), to the antennas 1116 for transmission to one or more other devices. This may include, for example, transmission of information to complete attachment to a network and communication with a camped UE 115 according to some aspects of the present disclosure. The antennas 1116 may further receive data messages transmitted from other devices and provide the received data messages for processing and/or demodulation at the transceiver 1110. The transceiver 1110 may provide the demodulated and decoded data to the sidelink configuration module 1108 for processing. The antennas 1116 may include multiple antennas of similar or different designs in order to sustain multiple transmission links.

In an aspect, the BS 1100 can include multiple transceivers 1110 implementing different RATs (e.g., NR and LTE). In an aspect, the BS 1100 can include a single transceiver 1110 implementing multiple RATs (e.g., NR and LTE). In an aspect, the transceiver 1110 can include various components, where different combinations of components can implement different RATs.

Figure 12:
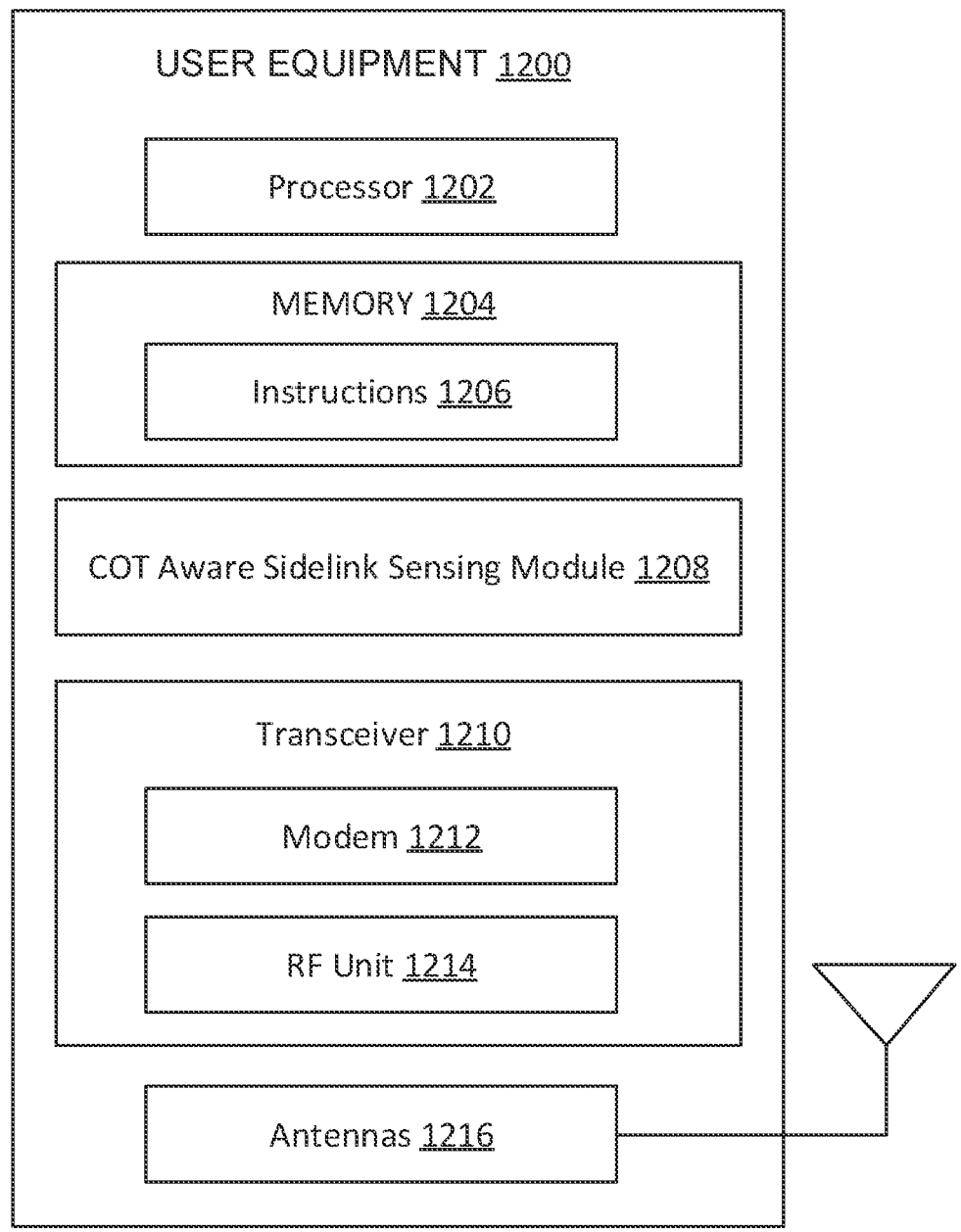
FIG. 12 is a block diagram of an exemplary user equipment (UE) according to some aspects of the present disclosure.

FIG. 12 is a block diagram of an exemplary UE 1200 according to some aspects of the present disclosure. The UE 1200 may be a UE 115 as discussed above with respect to FIG. 1 or a UE 215 as discussed above with respect to FIGS. 2, 3A-3B, 4-9, and 10A-10B. As shown, the UE 1200 may include a processor 1202, a memory 1204, an COT aware sidelink sensing module 1208, a transceiver 1210 including a modem subsystem 1212 and a radio frequency (RF) unit 1214, and one or more antennas 1216. The term "coupled" may refer to directly or indirectly coupled or connected to one or more intervening elements. For instance, these elements may be in direct or indirect communication with each other, for example via one or more buses.

The processor 1202 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1202 may also be implemented as a combination of computing devices, e.g., a combination of a DSP and a microprocessor, a plurality of microprocessors, one or more microprocessors in conjunction with a DSP core, or any other such configuration.

The memory 1204 may include a cache memory (e.g., a cache memory of the processor 1202), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 1204 includes a non-transitory computer-readable medium. The memory 1204 may store, or have recorded thereon, instructions 1206. The instructions 1206 may include instructions that, when executed by the processor 1202, cause the processor 1202 to perform the operations described herein with reference to the UEs 115 and/or 215 in connection with aspects of the present disclosure, for example, aspects of FIGS. 2, 3A-3B, 4-9, and 10A-10B. Instructions 1206 may also be referred to as program code, which may be interpreted broadly to include any type of computer-readable statement(s) as discussed above with respect to FIG. 11.

The COT aware sidelink sensing module 1208 may be implemented via hardware, software, or combinations thereof. For example, the COT aware sidelink sensing module 1208 may be implemented as a processor, circuit, and/or instructions 1206 stored in the memory 1204 and executed by the processor 1202. In some examples, the COT aware sidelink sensing module 1208 can be integrated within the modem subsystem 1212. For example, the COT aware sidelink sensing module 1208 can be implemented by a combination of software components (e.g., executed by a DSP or a general processor) and hardware components (e.g., logic gates and circuitry) within the modem subsystem 1212.

The COT aware sidelink sensing module 1208 may communicate with one or more components of the UE 1200 to perform for various aspects of the present disclosure, for example, aspects of FIGS. 2, 3A-3B, 4-9, and 10A-10B. In some aspects, the COT aware sidelink sensing module 1208 is configured to select at least a first resource from available resources in a sidelink resource pool within a shared ratio frequency band. In some aspects, the COT aware sidelink sensing module 1208 selects the first resource based on a channel-access gap preceding each resource of the available resources. In some aspects, the COT aware sidelink sensing module 1208 is configured to determine the availability of the channel-access gap preceding each resource of the available resources and select the first resource based on the availability of the channel-access gap, as described with respect to FIGS. 5 and 6. In some aspects, COT aware sidelink sensing module 1208 is configured to determine whether the channel-access gap is available for a first channel access type, such as a type 1 LBT, or a second channel access type, such as a type 2 LBT, to determine the availability of the channel-access gap.

Further, in some aspects, COT aware sidelink sensing module 1208 is configured to transmit an indication of the availability of the channel-access gap. As described with respect to FIG. 6, the indication of the availability of the channel-access gap may include an indication associated with each resource of the available resources (e.g., the channel-access availability is indicated on a per-resource basis) and/or an indication associated with each slot preceding a resource of the available resources (e.g., the channel-access availability is indicated on a per-slot basis). Further, in some aspects, COT aware sidelink sensing module 1208 is configured to determine the availability of the channel-access gap based on a sensing request, as described with respect to method 500 of FIG. 5.

In some aspects, COT aware sidelink sensing module 1208 is configured to identify one or more leading resources for one or more subsets (e.g., groups) of two or more resources in the available resources, where each of the one or more subsets is in consecutive slots, as described with respect to FIG. 6. That is, for example, the COT aware sidelink sensing module 1208 is configured to identify groups of two or more consecutive resources in the time domain and may identify the initial (e.g., leading) resource of these groups. While the resources in the subsets may be positioned in consecutive slots, in some aspects, a subset may include resources in different subchannels in the frequency domain. Further, in some aspects, the COT aware sidelink sensing module 1208 is configured to select a first leading resource of the one or more leading resources as the selected first resource.

In some aspects, COT aware sidelink sensing module 1208 is configured to receive candidate resources filter the candidate resources based on a size L for a burst transmission, as described with respect to FIG. 7. The COT aware sidelink sensing module 1208 is configured to then select the first resource from among the subsets of L resources in consecutive slots (e.g., based on the first subset including L resources). Additionally or alternatively, the candidate resources reported as available resources may be filtered to include only the subsets having the size L.

Further, in some aspects, the COT aware sidelink sensing module 1208 is configured to select a second resource from the available resources, determine that the second resource is unavailable based on a reevaluation of the availability of the second resource, and based on determining the second resource is unavailable, select the first resource. For instance, in the case that the second resource is a leading resource, as described above with reference to FIG. 6 and FIG. 8, the COT aware sidelink sensing module 1208 is configured to identify the first resource as a leading resource and select the first resource. In some aspects, in the case that the second resource is a non-leading resource, the COT aware sidelink sensing module 1208 is configured to select the first resource in response to determining the second resource is unavailable based on the priority of the one or more data blocks and/or the number of non-leading resources identified as unavailable in a last-minute re-evaluation.

In some aspects, the COT aware sidelink sensing module 1208 is configured to select the first resource based on a burst transmission configuration. For instance, as described with respect to FIG. 9, the burst transmission configuration may include an indication to select the first resource, where the selection is based on the channel-access gap, based on at least one of a quantity of data blocks queued for transmission at the UE 1200, priorities associated with the data blocks, a packet delay budget associated with the data blocks, a network configuration, or a channel busy ratio (CBR).

In some aspects, the COT aware sidelink sensing module 1208 is configured to transmit, to a second UE (e.g., 115 or 215) using the selected first resource, one or more data blocks for a sidelink transmission. In some aspects, the COT aware sidelink sensing module 1208 is configured to transmit two or more data blocks for the sidelink transmission using the selected first resource and a first-channel access gap following the first resource. For example, as illustrated and described with respect to FIG. 10, the COT aware sidelink sensing module 1208 is configured to use post extension to use at least a portion of the first channel-access gap.

In some aspects, COT aware sidelink sensing module 1208 is configured to receive an indication of the availability of the first resource and a second resource included in the first subset (e.g., led by the first resource) based on a resource revaluation request, as described with respect to FIG. 8. Further, in some aspects, the COT aware sidelink sensing module 1208 is configured to determine the second resource (e.g., a non-leading resource) is unavailable based on indication of the availability (e.g., an updated resource report). Based on determining the second resource is unavailable, the COT aware sidelink sensing module 1208 is configured to may select a third resource from among the available resource to replace the second resource. The COT aware sidelink sensing module 1208 is configured to then transmit the one or more data blocks using the first resource and the third resource (e.g., the replacement resource). In some aspects, based on determining the second resource is unavailable, the COT aware sidelink sensing module 1208 is configured to transmit a partial burst transmission. To that end, the COT aware sidelink sensing module 1208 is configured to refrain from transmitting a portion of the burst transmission.

As shown, the transceiver 1210 may include the modem subsystem 1212 and the RF unit 1214. The transceiver 1210 can be configured to communicate bi-directionally with other devices, such as the BSs 105. The modem subsystem 1212 may be configured to modulate and/or encode the data from the memory 1204 and/or the COT aware sidelink sensing module 1208 according to a modulation and coding scheme (MCS), e.g., a low-density parity check (LDPC) coding scheme, a turbo coding scheme, a convolutional coding scheme, a digital beamforming scheme, etc. The RF unit 1214 may be configured to process (e.g., perform analog to digital conversion or digital to analog conversion, etc.) modulated/encoded data (e.g., PSCCH SCI, PSSCH data, COT-SI) from the modem subsystem 1212 (on outbound transmissions) or of transmissions originating from another source such as a UE 115 or a BS 105. The RF unit 1214 may be further configured to perform analog beamforming in conjunction with the digital beamforming. Although shown as integrated together in transceiver 1210, the modem subsystem 1212 and the RF unit 1214 may be separate devices that are coupled together at the UE 115 to enable the UE 115 to communicate with other devices.

The RF unit 1214 may provide the modulated and/or processed data, e.g. data packets (or, more generally, data messages that may include one or more data packets and other information), to the antennas 1216 for transmission to one or more other devices. The antennas 1216 may further receive data messages transmitted from other devices. The antennas 1216 may provide the received data messages for processing and/or demodulation at the transceiver 1210. The transceiver 1210 may provide the demodulated and decoded data (e.g., RRC configuration, sidelink resource pools configurations, PSCCH SCI, PSSCH data, COT-SI) to the COT aware sidelink sensing module 1208 for processing. The antennas 1216 may include multiple antennas of similar or different designs in order to sustain multiple transmission links. The RF unit 1214 may configure the antennas 1216.

In some aspects, the processor 1202 is configured to communicate with one or more components of the UE 1200 to select at least a first resource from available resources in a sidelink resource pool within a shared radio frequency band based on a channel-access gap preceding each resource of the available resources. The transceiver 1210 is coupled to the processor 1202 and configured to communicate with one or more components of the UE 1200 to transmit, to a second UE (e.g., the UEs 115 and/or 215) using the selected first resource, one or more data blocks for a sidelink transmission.

In an aspect, the UE 1200 can include multiple transceivers 1210 implementing different RATs (e.g., NR and LTE). In an aspect, the UE 1200 can include a single transceiver 1210 implementing multiple RATs (e.g., NR and LTE). In an aspect, the transceiver 1210 can include various components, where different combinations of components can implement different RATs.

Figure 13:
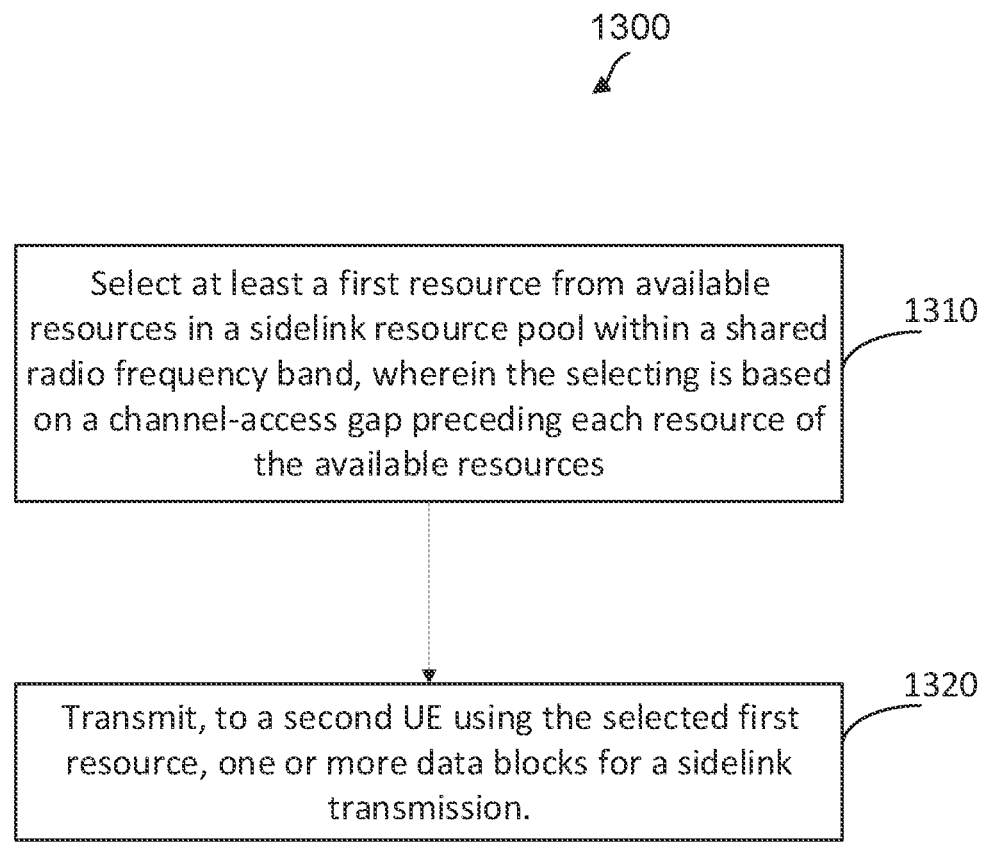
FIG. 13 is a flow diagram of a wireless communication method according to some aspects of the present disclosure.

FIG. 13 is a flow diagram of a wireless communication method 1300 according to some aspects of the present disclosure. Aspects of the method 1300 can be executed by a computing device (e.g., a processor, processing circuit, and/or other suitable component) of a wireless communication device or other suitable means for performing the steps. For example, a wireless communication device, such as a UE 115, 215, 1200 may utilize one or more components, such as the processor 1202, the memory 1204, the COT aware sidelink sensing module 1208, the transceiver 1210, the modem 1212, and the one or more antennas 1216, to execute the steps of method 1300. The method 1300 may employ similar mechanisms as described above in FIGS. 4-9, and 10A. As illustrated, the method 1300 includes a number of enumerated steps, but aspects of the method 1300 may include additional steps before, after, and in between the enumerated steps. In some aspects, one or more of the enumerated steps may be omitted or performed in a different order.

At action 1310, a UE selects at least a first resource from available resources in a sidelink resource pool within a shared ratio frequency band. In some aspects, the UE selects the first resource based on a channel-access gap preceding each resource of the available resources. For instance, in some aspects, the UE determines the availability of the channel-access gap preceding each resource of the available resources and selects the first resource based on the availability of the channel-access gap. In some aspects, for example, the UE selects the first resource based on a first channel-access gap associated with the first resource, where the availability of the channel-access gap indicates the first channel-access gap. In some aspects, a PHY layer of the UE (e.g., PHY layer 304) may, based on sensing, identify the availability of channel-access gaps preceding the available resources. The PHY layer may identify the availability of a channel-access gap as a first, second, or third type of availability. To that end, the PHY layer 304 may identify a channel-access gap as being unreserved, partially reserved, or fully reserved based on the SCI decoding (e.g., SCI decoding of a reservation for a channel-access gap), signal measurements, and/or priority information. In some aspects, the PHY layer may determine whether the channel-access gap is available for a first channel access type, such as a type 1 LBT, or a second channel access type, such as a type 2 LBT, to determine the availability of the channel-access gap. Further, in some aspects, the PHY layer may transmit an indication of the availability of the channel-access gap to a MAC layer of the UE (e.g., MAC layer 302). As described with respect to FIG. 6, the indication of the availability of the channel-access gap may include an indication associated with each resource of the available resources (e.g., the channel-access availability is indicated on a per-resource basis) and/or an indication associated with each slot preceding a resource of the available resources (e.g., the channel-access availability is indicated on a per-slot basis). Further, in some aspects, the MAC layer may transmit a sensing request including a request for the indication of the availability of the channel-access gap to the PHY layer, and the PHY layer may determine the availability of the channel-access gap based on the sensing request, as described with respect to method 500 of FIG. 5.

In some aspects, the UE may identify one or more leading resources for one or more subsets (e.g., groups) of two or more resources in the available resources, where each of the one or more subsets is in consecutive slots. That is, for example, the UE may identify groups of two or more consecutive resources in the time domain and may identify the initial (e.g., leading) resource of these groups. While the resources in the subsets may be positioned in consecutive slots, in some aspects, a subset may include resources in different subchannels in the frequency domain. Further, the UE may select a first leading resource of the one or more leading resources as the selected first resource. At least a first subset of the one or more subsets may include the first leading resource. In some aspects, the UE may select the first leading resource based on a priority of the first leading resource among the one or more leading resources. For instance, as described with reference to FIG. 6, leading resources that lead greater numbers of subsets (e.g., groups) of consecutive resources may have a higher priority than leading resources that lead fewer numbers of subsets. Accordingly, the UE may select the first leading resource based on the first leading resource having a higher priority than the other leading resources. In some aspects, the UE may select the first leading resource randomly from among leading resources having equal priority. In some aspects, the UE may select the first leading resource based on a quantity of the subsets lead by the leading resource. In that regard, the first leading resource may be associated with multiple subsets, where at least some of the resources of these subsets are located in different subchannels in the frequency domain. Further, in some aspects, the UE may determine the quantity of resources included in the first subset lead by the first leading resource and may select the first resource based on this quantity of resources. In particular, the UE may receive candidate resources at the MAC layer and may filter the candidate resources based on a size L for a burst transmission, as described with respect to FIG. 7. The UE may then select the first resource from among the subsets of L resources in consecutive slots (e.g., based on the first subset including L resources). Additionally or alternatively, the subsets of resources may be identified at the PHY layer of the UE based on the quantity of resources included in the subsets (e.g., based on the size L). The PHY layer may then filter the candidate resources reported as available resources to the MAC layer based on the identified subsets.

Further, in some aspects, the UE may select a second resource from the available resources, may determine that the second resource is unavailable based on a reevaluation of the availability of the second resource, and based on determining the second resource is unavailable, the UE may select the first resource. For instance, in the case that the second resource is a leading resource, as described above with reference to FIG. 6 and FIG. 8, the UE may identify the first resource as a leading resource and select the first resource. In some aspects, in the case that the second resource is a non-leading resource, the UE may select the first resource in response to determining the second resource is unavailable based on the priority of the one or more data blocks and/or the number of non-leading resources identified as unavailable in a last-minute re-evaluation.

In some aspects, the UE may select the first resource based on a burst transmission configuration. For instance, as described with respect to FIG. 9, the burst transmission configuration may include an indication to select the first resource, where the selection is based on the channel-access gap, based on at least one of a quantity of data blocks queued for transmission at the UE, priorities associated with the data blocks, a packet delay budget associated with the data blocks, a network configuration, or a channel busy ratio (CBR).

In some aspects, the UE may utilize one or more components, such as the processor 1202, the memory 1204, the COT aware sidelink sensing module 1208, the transceiver 1210, the modem 1212, and the one or more antennas 1216, to perform the operations at action 1310.

At action 1320, the UE transmits, to a second UE using the selected first resource, one or more data blocks for a sidelink transmission. In some aspects, the UE may transmit two or more data blocks for the sidelink transmission using the selected first resource and a first-channel access gap following the first resource. For example, as illustrated and described with respect to FIG. 10, the UE may use post extension to use at least a portion of the first channel-access gap.

In some aspects, the MAC layer may transmit a resource reevaluation request to the PHY layer for a last-minute re-evaluation of a resource. The MAC layer may further receive an indication of the availability of the first resource and a second resource included in the first subset (e.g., led by the first resource) based on the resource revaluation request, as described with respect to FIG. 8. Further, in some aspects, the UE may determine the second resource (e.g., a non-leading resource) is unavailable based on indication of the availability (e.g., an updated resource report). Based on determining the second resource is unavailable, the UE may select a third resource from among the available resource to replace the second resource. The UE may then transmit the one or more data blocks using the first resource and the third resource (e.g., the replacement resource). In some aspects, based on determining the second resource is unavailable, the UE may transmit a partial burst transmission. To that end, the UE may refrain from transmitting a portion of the burst transmission.

In some aspects, the UE may utilize one or more components, such as the processor 1202, the memory 1204, the COT aware sidelink sensing module 1208, the transceiver 1210, the modem 1212, and the one or more antennas 1216, to perform the operations at action 1320.

Further aspects of the present disclosure include the following:

1. A method of wireless communication performed by a first user equipment (UE), the method comprising:
selecting at least a first resource from available resources in a sidelink resource pool within a shared radio frequency band, wherein the selecting is based on a channel-access gap preceding each resource of the available resources; and
transmitting, to a second UE using the selected first resource, one or more data blocks for a sidelink transmission.

2. The method of clause 1, further comprising:
determining an availability of the channel-access gap preceding each resource of the available resources, wherein the selecting the first resource is further based on the availability of the channel-access gap.

3. The method of clause 2, wherein the determining the availability of the channel-access gap comprises determining whether the channel-access gap is available for a first channel access type or a second channel access type.

4. The method of any of clauses 2 or 3, comprising:
transmitting, by a physical (PHY) layer to a media access control (MAC) layer, an indication of the availability of the channel-access gap.

5. The method of clause 4, wherein the indication of the availability of the channel-access gap comprises an indication associated with each resource of the available resources.

6. The method of clause 4, wherein the indication of the availability of the channel-access gap comprises an indication associated with each slot preceding a resource of the available resources.

7. The method of any of clauses 2 or 3, further comprising:
transmitting, by a media access control (MAC) layer to a physical (PHY) layer, a sensing request, wherein the sensing request comprises a request for an indication of the availability of the channel-access gap, and
wherein the determining the availability of the channel-access gap comprises:
determining, by the PHY layer based on the sensing request, the availability of the channel-access gap.

8. The method of clause of any of clauses 2-7, wherein the selecting the first resource is further based on:
a first channel-access gap associated with the first resource, the availability of the channel-access gap indicating the first channel-access gap.

9. The method of any of clauses 1-8, wherein selecting the first resource comprises:
identifying one or more leading resources for one or more subsets of two or more resources in the available resources, wherein each of the one or more subsets is in consecutive slots; and
selecting a first leading resource of the one or more leading resources, wherein a first subset of the one or more subsets comprises the first leading resource.

10. The method of clause 9, wherein the selecting the first resource comprises selecting the first leading resource further based on a priority of the first leading resource among the one or more leading resources.

11. The method of any of clauses 9 or 10, wherein at least one subset of the one or more subsets includes resources in different subchannels.

12. The method of clause 11, further comprising:
wherein the selecting the first resource comprises selecting the first leading resource further based on a quantity of the one or more subsets associated with the respective leading resource.

13. The method of any of clauses 9-12, further comprising:
determining a quantity of resources included in the first subset,
wherein the selecting the first resource from the available resources comprises selecting the first resource further based on the quantity of resources.

14. The method of any of clauses 9-12, further comprising:
identifying the one or more subsets based on a quantity of available resources in consecutive slots included in each subset,
wherein the available resources from the sidelink resource pool comprise only the identified one or more subsets.
15. The method of any of clauses 9-14, further comprising transmitting, from a MAC layer to a PHY layer, a resource reevaluation request; and
receiving, at the MAC layer from the PHY layer, an indication of an availability of the first resource and a second resource included in the first subset based on the resource reevaluation request.
16. The method of clause 15, further comprising:
determining, based on the indication, that the second resource is unavailable; and
selecting, in response to the determining, a third resource from the available resources,
wherein the transmitting the one or more data blocks comprises transmitting the one or more data blocks using the selected first resource and the selected third resource.
17. The method of clause 15, further comprising:
determining, based on the indication, that the second resource is unavailable, and wherein:
the transmitting, using the selected first resource, the one or more data blocks comprises refraining from transmitting a portion of a burst transmission.
18. The method of any of clauses 1-14, further comprising:
selecting a second resource of the available resources; and
determining, based on a reevaluation of an availability of the second resource, that the second resource is unavailable,
wherein the selecting the first resource from the available resources comprises:
   selecting, in response to determining that the second resource is unavailable, the first resource.
19. The method of any of clauses 1-18, wherein the selecting the first resource is further based on a burst transmission configuration, wherein the burst transmission configuration includes an indication to select the first resource based on the channel-access gap based on at least one of a quantity of data blocks queued for transmission at the first UE, priorities associated with the data blocks, a packet delay budget associated with the data blocks, a network configuration, or a channel busy ratio (CBR).
20. The method of any of clauses 1-19, wherein the transmitting the one or more data blocks comprises:
transmitting two or more data blocks using the selected first resource and a first channel-access gap following the first resource.
21. A first user equipment (UE), comprising:
a processor configured to select at least a first resource from available resources in a sidelink resource pool within a shared radio frequency band based on a channel-access gap preceding each resource of the available resources; and
a transceiver coupled to the processor, the transceiver configured to transmit, to a second UE using the selected first resource, one or more data blocks for a sidelink transmission.
22. The first UE of clause 21, wherein the processor is further configured to:
determine an availability of the channel-access gap preceding each resource of the available resources,
wherein the processor configured to select the first resource is further configured to select the first resource based on the availability of the channel-access gap.
23. The first UE of clause 22, wherein the processor configured to determine the availability of the channel-access gap is further configured to determine whether the channel-access gap is available for a first channel access type or a second channel access type.
24. The first UE of any of clauses 22 or 23, wherein the processor is further configured to:
transmit, at a physical (PHY) layer to a media access control (MAC) layer, an indication of the availability of the channel-access gap.
25. The first UE of any of clauses 22 or 23, wherein the processor is further configured to:
transmit, at a media access control (MAC) layer to a physical (PHY) layer, a sensing request, wherein the sensing request comprises a request for an indication of the availability of the channel-access gap, and
wherein the processor configured to determine the availability of the channel-access gap is further configured to:
determine, at the PHY layer based on the sensing request, the availability of the channel-access gap.
26. The first UE of any of clauses 22-25, wherein the processor configured to select the first resource is further configured to select the first resource based on:
a first channel-access gap associated with the first resource, the availability of the channel-access gap indicating the first channel-access gap.
27. The first UE of any of clauses 21-26, wherein the processor configured to select the first resource is further configured to:
identify one or more leading resources for one or more subsets of two or more resources in the available resources, wherein each of the one or more subsets is in consecutive slots; and
select a first leading resource of the one or more leading resources, wherein a first subset of the one or more subsets comprises the first leading resource.
28. A non-transitory computer-readable medium having program code recorded thereon, the program code comprising:
code for causing a first user equipment (UE) to select at least a first resource from available resources in a sidelink resource pool within a shared radio frequency band based on a channel-access gap preceding each resource of the available resources; and
code for causing the first UE to transmit, to a second UE using the selected first resource, one or more data blocks for a sidelink transmission.
29. The non-transitory computer-readable medium of clause 28, further comprising:
code for causing the first UE to determine an availability of the channel-access gap preceding each resource of the available resources,
wherein the code for causing the first UE to select the first resource is further configured to cause the first UE to select the first resource based on the availability of the channel-access gap.
30. A first user equipment (UE), comprising:
means for selecting at least a first resource from available resources in a sidelink resource pool within a shared radio frequency band based on a channel-access gap preceding each resource of the available resources; and means for transmitting, to a second UE using the selected first resource, one or more data blocks for a sidelink transmission.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a first user equipment (UE), the method comprising:
    sensing a plurality of resources in a sidelink resource pool within a shared radio frequency band, wherein the sensing comprises decoding Sidelink Control Information (SCI);
    identifying a plurality of candidate resources based on the decoded SCI;
    determining a duration of a channel-access gap preceding each of the plurality of candidate resources;
    selecting at least a first resource from the plurality of candidate resources based on the duration of the channel-access gap preceding each of the plurality of candidate resources; and
    transmitting, to a second UE using the selected first resource, one or more data blocks for a sidelink transmission.

2. The method of claim 1,
    wherein determining the duration of the channel-access gap preceding each of the plurality of candidate resources comprises determining whether the duration of the channel-access gap is no gap, less than or equal to a first duration, or greater than or equal to a second duration.

3. The method of claim 2, wherein the duration of the channel-access gap indicates whether the channel-access gap is available for a first channel access type or a second channel access type.

4. The method of claim 2, comprising:
    transmitting, by a physical (PHY) layer to a media access control (MAC) layer, an indication of the duration of the channel-access gap.

5. The method of claim 4, wherein the indication of the duration of the channel-access gap comprises an indication associated with each of the plurality of candidate resources.

6. The method of claim 4, wherein the indication of the duration of the channel-access gap comprises an indication associated with each slot preceding each of the plurality of candidate resources.

7. The method of claim 2, further comprising:
    transmitting, by a media access control (MAC) layer to a physical (PHY) layer, a sensing request, wherein the sensing request comprises a request for an indication of the duration of the channel-access gap, and
    wherein the determining the availability of the channel-access gap comprises:
    determining, by the PHY layer based on the sensing request, the availability of the channel-access gap.

8. The method of claim 2, wherein the selecting the first resource is further based on:
    a first channel-access gap associated with the first resource, the duration of the channel-access gap indicating the duration of the first channel-access gap.

9. The method of claim 1, wherein selecting the first resource comprises:
    identifying one or more leading resources for one or more subsets of two or more of the plurality of candidate resources, wherein each of the one or more subsets is in consecutive slots; and
    selecting a first leading resource of the one or more leading resources, wherein a first subset of the one or more subsets comprises the first leading resource.

10. The method of claim 9, wherein the selecting the first resource comprises selecting the first leading resource further based on a priority of the first leading resource among the one or more leading resources.

11. The method of claim 9, wherein at least one subset of the one or more subsets includes candidate resources in different subchannels.

12. The method of claim 11, further comprising:
    wherein the selecting the first resource comprises selecting the first leading resource further based on a quantity of the one or more subsets associated with the respective leading resource.

13. The method of claim 9, further comprising:
    determining a quantity of resources included in the first subset, wherein the selecting the first resource from the plurality of candidate resources comprises selecting the first resource further based on the quantity of resources.

14. The method of claim 9, further comprising:
identifying the one or more subsets based on a quantity of available resources in consecutive slots included in each subset,
wherein the available resources from the sidelink resource pool comprise only the identified one or more subsets.

15. The method of claim 9, further comprising
transmitting, from a MAC layer to a PHY layer, a resource reevaluation request; and
receiving, at the MAC layer from the PHY layer, an indication of an availability of the first resource and a second resource included in the first subset based on the resource reevaluation request.

16. The method of claim 15, further comprising:
determining, based on the indication, that the second resource is unavailable; and
selecting, in response to the determining, a third resource from the plurality of candidate resources,
wherein the transmitting the one or more data blocks comprises transmitting the one or more data blocks using the selected first resource and the selected third resource.

17. The method of claim 15, further comprising:
determining, based on the indication, that the second resource is unavailable, and wherein:
the transmitting, using the selected first resource, the one or more data blocks comprises refraining from transmitting a portion of a burst transmission.

18. The method of claim 1, further comprising:
selecting a second resource of the plurality of candidate resources; and
determining, based on a reevaluation of an availability of the second resource, that the second resource is unavailable,
wherein the selecting the first resource from the plurality of candidate resources comprises:
selecting, in response to determining that the second resource is unavailable, the first resource.

19. The method of claim 1, wherein the selecting the first resource is further based on a burst transmission configuration, wherein the burst transmission configuration includes an indication to select the first resource based on the channel-access gap based on at least one of a quantity of data blocks queued for transmission at the first UE, priorities associated with the data blocks, a packet delay budget associated with the data blocks, a network configuration, or a channel busy ratio (CBR).

20. The method of claim 1, wherein the transmitting the one or more data blocks comprises:
transmitting two or more data blocks using the selected first resource and a first channel-access gap following the first resource.

21. A first user equipment (UE), comprising:
a processor configured to:
sense a plurality of resources in a sidelink resource pool within a shared radio frequency band, wherein the sensing comprises decoding Sidelink Control Information (SCI);
identify a plurality of candidate resources based on the decoded SCI;
determine a duration of a channel-access gap preceding each of the plurality of candidate resources; and
select at least a first resource from the plurality of candidate resources based on the duration of the channel-access gap preceding each of the plurality of candidate resources; and
a transceiver coupled to the processor, the transceiver configured to transmit, to a second UE using the selected first resource, one or more data blocks for a sidelink transmission.

22. The first UE of claim 21, wherein the duration of the channel-access gap is no gap, less than or equal to a first duration, or greater than or equal to a second duration.

23. The first UE of claim 22, wherein the duration of the channel-access gap is indicative of whether the channel-access gap is available for a first channel access type or a second channel access type.

24. The first UE of claim 22, wherein the processor is further configured to:
transmit, at a physical (PHY) layer to a media access control (MAC) layer, an indication of the duration of the channel-access gap.

25. The first UE of claim 22, wherein the processor is further configured to:
transmit, at a media access control (MAC) layer to a physical (PHY) layer, a sensing request, wherein the sensing request comprises a request for an indication of the duration of the channel-access gap, and
wherein the processor configured to determine the duration of the channel-access gap is further configured to:
determine, at the PHY layer based on the sensing request, the duration of the channel-access gap.

26. The first UE of claim 22, wherein the processor configured to select the first resource is further configured to select the first resource based on:
a first channel-access gap associated with the first resource, the duration of the channel-access gap indicating the duration of the first channel-access gap.

27. The first UE of claim 21, wherein the processor configured to select the first resource is further configured to:
identify one or more leading resources for one or more subsets of two or more of the plurality of candidate resources, wherein each of the one or more subsets is in consecutive slots; and
select a first leading resource of the one or more leading resources, wherein a first subset of the one or more subsets comprises the first leading resource.

28. A non-transitory computer-readable medium having program code recorded thereon, the program code comprising:
code for causing a first user equipment (UE) to sense a plurality of resources in a sidelink resource pool within a shared radio frequency band, wherein the sensing comprises decoding Sidelink Control Information (SCI);
code for causing the first UE to identify a plurality of candidate resources based on the decoded SCI;
code for causing the first UE to determine a duration of a channel-access gap preceding each of the plurality of candidate resources
code for causing the first UE to select at least a first resource from the plurality of candidate resources based on the duration of the channel-access gap preceding each of the plurality of candidate resources; and
code for causing the first UE to transmit, to a second UE using the selected first resource, one or more data blocks for a sidelink transmission.

29. The non-transitory computer-readable medium of claim 28, wherein the code for causing the first UE to determine the duration of the channel-access gap preceding each of the plurality of candidate resources, code for causing the first UE to determine whether the duration of the channel-access gap is no gap, less than or equal to a first duration, or greater than or equal to a second duration.

30. A first user equipment (UE), comprising:
means for sensing a plurality of resources in a sidelink resource pool within a shared radio frequency band, wherein the sensing comprises decoding Sidelink Control Information (SCI);
means for identifying a plurality of candidate resources based on the decoded SCI;
means for determining a duration of a channel-access gap preceding each of the plurality of candidate resources
means for selecting at least a first resource from the plurality of candidate resources based on the channel-access gap preceding each of the plurality of candidate resources; and
means for transmitting, to a second UE using the selected first resource, one or more data blocks for a sidelink transmission.

\* \* \* \* \*